United States Patent
Fujiwara et al.

(10) Patent No.: US 7,035,774 B2
(45) Date of Patent: Apr. 25, 2006

(54) PORTABLE TERMINAL AND MESSAGE NOTIFYING SYSTEM USING THE SAME

(75) Inventors: Hiroaki Fujiwara, Takatsuki (JP);
Hiroyuki Inoue, Yawata (JP);
Masanori Yasutake, Hirakata (JP);
Yoshimasa Takeda, Yokohama (JP);
Youichi Nakamura, Osaka (JP);
Kazumasa Okumura, Kyoto-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/228,916

(22) Filed: Aug. 28, 2002

(65) Prior Publication Data

US 2003/0139176 A1  Jul. 24, 2003

(30) Foreign Application Priority Data

Aug. 28, 2001 (JP) .............................. 2001-257980
Aug. 29, 2001 (JP) .............................. 2001-259280
Feb. 20, 2002 (JP) .............................. 2002-043035

(51) Int. Cl.
*G06F 11/30* (2006.01)

(52) U.S. Cl. .................... 702/188; 700/121; 340/504

(58) Field of Classification Search ............ 702/57–59, 702/81–84, 122, 182–183, 188; 700/121–129, 700/108–111; 340/3.43–3.44, 502–505, 340/568.1, 653
See application file for complete search history.

(56) References Cited

U.S. PATENT DOCUMENTS

| | | | | |
|---|---|---|---|---|
| 4,827,395 A | * | 5/1989 | Anders et al. .................. 700/9 |
| 5,278,539 A | * | 1/1994 | Lauterbach et al. ... 340/539.18 |
| 6,384,723 B1 | * | 5/2002 | Keeler et al. ................ 340/513 |
| 6,625,569 B1 | * | 9/2003 | James et al. ................ 702/183 |
| 6,629,007 B1 | * | 9/2003 | Hattori et al. .............. 700/100 |
| 6,662,345 B1 | * | 12/2003 | Uchida et al. ................. 716/1 |
| 6,678,612 B1 | * | 1/2004 | Khawam ..................... 701/213 |

FOREIGN PATENT DOCUMENTS

WO    00/63763    10/2000

\* cited by examiner

*Primary Examiner*—Marc S. Hoff
*Assistant Examiner*—Mary Catherine Baran
(74) *Attorney, Agent, or Firm*—Wenderoth, Lind & Ponack, L.L.P.

(57) ABSTRACT

A portable terminal carried by an operator of a target apparatus includes a communicating device for conducting wireless communication and a first information acquiring device for acquiring first information related to the target apparatus from the target apparatus via the communicating device. The portable terminal also includes a second information sending device for sending second information to at least one external information terminal via the communicating device based on the first information. Further, the portable terminal includes a third information acquiring device for acquiring third information from at least one external information terminal responding to the second information via the communicating device and an information outputting device for outputting an information output based on the third information.

6 Claims, 45 Drawing Sheets

FIG. 13A

| APPARATUS NAME | MACHINE TYPE NAME | TIME OF OCCURENCE | TROUBLE NUMBER | LOCATION OF OCCURENCE | NOTIFICATION LEVEL | TRANSMISSION COMPLETE FLAG |
|---|---|---|---|---|---|---|
| MV-1 | MV | 07/17/2001 10:05:05 | EE1010 | - | | |
| MV-2 | MV | 07/17/2001 11:23:00 | ER1025 | Z23 | | |
| MPA-1 | MPA | 07/17/2001 12:20:30 | EE1010 | - | | |
| *** | *** | *** | *** | *** | | |
| *** | *** | *** | *** | *** | | |

FIG. 13B

| MACHINE TYPE NAME | TROUBLE NUMBER | NOTIFICATION LEVEL |
|---|---|---|
| MV | EE1010 | UNNECESSARY |
| MV | ER1025 | ALL |
| MPA | EE1010 | OPERATOR IN CHARGE |
| MPA | ER1011 | G1 |
| *** | *** | *** |

FIG. 13C

| JOB NAME | TARGET APPARATUS | NAME OF STAFF-IN-CHARGE | GROUP | TERMINAL NUMBER |
|---|---|---|---|---|
| OPERATION 1 | MV-1, MV-2 MPA-1 | A | G2 | 1 |
| COMPONENT REPLENISHMENT 1 | MV-1, MV-2 MPA-2 | B | G3 | 2 |
| *** | *** | *** | *** | *** |

FIG. 13D

| APPARATUS NAME | MACHINE TYPE NAME | TIME OF OCCURENCE | TROUBLE NUMBER | LOCATION OF OCCURENCE | NOTIFICATION LEVEL | TRANSMISSION COMPLETE FLAG |
|---|---|---|---|---|---|---|
| MV-1 | MV | 07/17/2001 10:05:05 | EE1010 | - | UNNECESSARY | |
| MV-2 | MV | 07/17/2001 11:23:00 | ER1025 | Z23 | ALL | TRANSMITTED |
| MPA-1 | MPA | 07/17/2001 12:20:30 | EE1010 | - | STAFF-IN-CHARGE A | TRANSMITTED |
| *** | *** | *** | *** | *** | *** | |
| *** | *** | *** | *** | *** | *** | |

FIG. 15A

| APPARATUS NAME | MACHINE TYPE NAME | TROUBLE NUMBER | NECESSITY OF INQUIRY FLAG | TARGET OF INQUIRY | INQUIRY COMPLETE FLAG | REPLAY COMPLETE FLAG |
|---|---|---|---|---|---|---|
| MV-1 | MV | EE1010 | UNNECESSARY | | | |
| MV-2 | MV | ER1025 | NECESSARY | | | |
| *** | *** | *** | *** | | | |

FIG. 15B

| APPARATUS NAME | MACHINE TYPE NAME | TROUBLE NUMBER | NECESSITY OF INQUIRY FLAG | TARGET OF INQUIRY | INQUIRY COMPLETE FLAG | REPLAY COMPLETE FLAG |
|---|---|---|---|---|---|---|
| MV-1 | MV | EE1010 | UNNECESSARY | | | |
| MV-2 | MV | ER1025 | NECESSARY | X OFFICE, 2ND DEPT | TRANSMITTED | TRANSMITTED |
| | | | | X OFFICE, 4TH DEPT | TRANSMITTED | |
| | | | | X OFFICE, 1ST DEPT | TRANSMITTED | TRANSMITTED |
| *** | *** | *** | *** | | | |

FIG. 16

| MACHINE TYPE NAME | TROUBLE NUMBER | NOTIFICATION LEVEL | PRIORITY LEVEL | TARGET OF INQUIRY |
|---|---|---|---|---|
| MV | EE1010 | UNNECESSARY | 1 | X OFFICE, 1ST DEPT |
| | | | 2 | X OFFICE, 2ND DEPT |
| MV | ER1025 | ALL | 1 | X OFFICE, 4TH DEPT |
| | | | 2 | X OFFICE, 1ST DEPT |
| | | | 3 | X OFFICE, 2ND DEPT |
| MPA | EE1010 | OPERATOR IN CHARGE | 1 | NONE |
| MPA | ER1011 | G1 | 1 | Y OFFICE, 1ST DEPT |
| | | | 2 | Y OFFICE, 2ND DEPT |
| | | | 3 | Y OFFICE, 3RD DEPT |
| *** | *** | *** | *** | *** |

Fig. 18A

| APPARATUS | TYPE | LINE TACT (SEC) | SUPPLY POSITION NUMBER | COMPO-NENT NUMBER | NUMBER | INITIAL NUMBER | USED NUMBER | RESIDUAL NUMBER | RESIDUAL TIME (SEC) | TIME OF NOTIFI-CATION (SEC) | COMPLE-TION FLAG |
|---|---|---|---|---|---|---|---|---|---|---|---|
| MV-1 | MV | 30 | 1 | ERJ1011 | 8 | 10000 | 0 | 10000 | 37500 | | |
| | | | 2 | ERJ1012 | 4 | 2550 | 0 | 2550 | 19125 | | |
| | | | 10 | VCM0070 | 1 | 1000 | 0 | 1000 | 30000 | | |
| MV-2 | MV | 30 | 1 | ECJ2010 | 2 | 4670 | 0 | 4670 | 70050 | | |
| | | | 2 | EVD2010 | 1 | 3000 | 0 | 3000 | 90000 | | |
| *** | *** | *** | *** | *** | *** | *** | *** | *** | *** | | |

Fig. 18B

| APPARATUS | TYPE | 0 | 0 |
|---|---|---|---|
| MV-1 | MV | 1 | 4800 |
| | | 2 | 2400 |
| | | 10 | 600 |

Fig. 18C

| APPARATUS | TYPE | LINE TACT (SEC) | SUPPLY POSITION NUMBER | COMPO-NENT NUMBER | NUMBER | INITIAL NUMBER | USED NUMBER | RESIDUAL NUMBER | RESIDUAL TIME (SEC) | TIME OF NOTIFI-CATION (SEC) | COMPLE-TION FLAG |
|---|---|---|---|---|---|---|---|---|---|---|---|
| MV-1 | MV | 30 | 1 | ERJ1011 | 8 | 10000 | 4800 | 5200 | 19500 | | |
| | | | 2 | ERJ1012 | 4 | 2550 | 2400 | 150 | 1125 | 1125 | TRANSMITTED |
| | | | 10 | VCM0070 | 1 | 1000 | 600 | 400 | 12000 | | |
| MV-2 | MV | 30 | 1 | ECJ2010 | 2 | 4670 | 1200 | 3470 | 52050 | | |
| | | | 2 | EVD2010 | 1 | 3000 | 600 | 2400 | 72000 | | |
| *** | *** | *** | *** | *** | *** | *** | *** | *** | *** | | |

Fig. 18D

| APPARATUS | TYPE | LINE TACT (SEC) | SUPPLY POSITION NUMBER | COMPO-NENT NUMBER | NUMBER | INITIAL NUMBER | USED NUMBER | RESIDUAL NUMBER | RESIDUAL TIME (SEC) | TIME OF NOTIFICA-TION (SEC) | COMPLE-TION FLAG |
|---|---|---|---|---|---|---|---|---|---|---|---|
| MV-1 | MV | 30 | 1 | ERJ1011 | 8 | 10000 | 4800 | 5200 | 19500 | | |
| | | | 2 | ERJ1012 | 4 | 7550 | 2450 | 5100 | 38250 | | |
| | | | 10 | VCM0070 | 1 | 1000 | 600 | 400 | 12000 | | |
| MV-2 | MV | 30 | 1 | ECJ2010 | 2 | 4670 | 1200 | 3470 | 52050 | | |
| | | | 2 | EVD2010 | 1 | 3000 | 600 | 2400 | 72000 | | |
| *** | *** | *** | *** | *** | *** | *** | *** | *** | *** | | |

Fig. 20A

| APPARATUS | TYPE | NOZZLE NUMBER | NUMBER OF SUCTIONS | NUMBER OF MOUNTING | NUMBER OF SUCTION ERRORS | NUMBER OF VERTICAL SUCTION ERRORS | NUMBER OF RECOGNITION ERRORS | SUCTION RATE (%) | MOUNTING RATE (%) | CONDITION FLAG |
|---|---|---|---|---|---|---|---|---|---|---|
| MV-1 | MV | 1 | 2600 | 2585 | 6 | 2 | 7 | 99.6 | 99.4 | |
| | | 2 | 2600 | 2586 | 0 | 4 | 10 | 99.8 | 99.4 | |
| | | 10 | 2600 | 2599 | 1 | 0 | 0 | 99.9 | 99.9 | |
| MV-2 | MV | 1 | 2200 | 2198 | 1 | 0 | 1 | 99.9 | 99.9 | |
| | | 2 | 2200 | 2197 | 1 | 1 | 1 | 99.9 | 99.8 | |
| *** | *** | *** | *** | *** | *** | *** | *** | *** | *** | |

Fig. 20B

| APPARATUS | TYPE | INSPECTED QUANTITY | NUMBER OF INSPECTED POSITIONS | DEFECT QUANTITY | NUMBER OF DEFECTIVE POSITIONS | RATE OF DEFECTIVE SUBSTRATE (%) | RATE OF DEFECTIVE MOUNTING POSITION (%) | CONDITION FLAG |
|---|---|---|---|---|---|---|---|---|
| IP-1 | IPK | 1200 | 360000 | 3 | 8 | 0.25 | 0.002 | |
| IP-2 | IPJ | 1205 | 373550 | 13 | 20 | 1.00 | 0.005 | |
| *** | *** | *** | *** | *** | *** | *** | *** | *** |

Fig. 20C

| APPARATUS | TYPE | NOZZLE NUMBER | NUMBER OF SUCTIONS | NUMBER OF MOUNTING | NUMBER OF SUCTION ERRORS | NUMBER OF VERTICAL SUCTION ERRORS | NUMBER OF RECOGNITION ERRORS | SUCTION RATE (%) | MOUNTING RATE (%) | CONDITION FLAG |
|---|---|---|---|---|---|---|---|---|---|---|
| MV-1 | MV | 1 | 2600 | 2585 | 6 | 2 | 7 | 99.6 | 99.4 | F |
|  |  | 2 | 2600 | 2586 | 0 | 4 | 10 | 99.8 | 99.4 | F |
|  |  | 10 | 2600 | 2599 | 1 | 0 | 0 | 99.9 | 99.9 |  |
| MV-2 | MV | 1 | 2200 | 2198 | 1 | 0 | 1 | 99.9 | 99.9 |  |
|  |  | 2 | 2200 | 2197 | 1 | 1 | 1 | 99.9 | 99.8 |  |
| *** | *** | *** | *** | *** | *** | *** | *** | *** | *** |  |

Fig. 20D

| APPARATUS | TYPE | INSPECTED QUANTITY | NUMBER OF INSPECTED POSITIONS | DEFECT QUANTITY | NUMBER OF DEFECTIVE POSITIONS | RATE OF DEFECTIVE SUBSTRATE (%) | RATE OF DEFECTIVE MOUNTING POSITION (%) | CONDITION FLAG |
|---|---|---|---|---|---|---|---|---|
| IP-1 | IPK | 1200 | 360000 | 3 | 8 | 0.25 | 0.002 | |
| IP-2 | IPJ | 1205 | 373550 | 13 | 20 | 1.00 | 0.005 | J |
| *** | *** | *** | *** | *** | *** | *** | *** | *** |

FIG. 22A

| APPARATUS NAME | MACHINE TYPE NAME | PLANNED TOTAL QUANTITY | CURRENT TARGETED QUANTITY | PRODUCED/ INSPECTED QUANTITY | DIFFERENCE | TIME OF NOTIFICATION | CONFIRMATION COMPLETE FLAG |
|---|---|---|---|---|---|---|---|
| MV-1 | MV | 7500 | 4900 | 4800 | -101 | | |
| MV-2 | MV | 7500 | 4900 | 4798 | -102 | | |
| IP-1 | IPK | 7500 | 4900 | 4790 | -110 | | |
| *** | *** | *** | *** | *** | *** | | |

FIG. 22B

| APPARATUS NAME | MACHINE TYPE NAME | PLANNED TOTAL QUANTITY | CURRENT TARGETED QUANTITY | PRODUCED/ INSPECTED QUANTITY | DIFFERENCE | TIME OF NOTIFICATION | CONFIRMATION COMPLETE FLAG |
|---|---|---|---|---|---|---|---|
| MV-1 | MV | 7500 | 4900 | 4800 | -101 | 07/19/2001 10:15:17 | TRANSMITTED |
| MV-2 | MV | 7500 | 4900 | 4798 | -102 | 07/19/2001 10:15:18 | TRANSMITTED |
| IP-1 | IPK | 7500 | 4900 | 4790 | -110 | 07/19/2001 10:15:19 | TRANSMITTED |
| *** | *** | *** | *** | *** | *** | *** | *** |

FIG. 28A

| APPARATUS NAME | MACHINE TYPE NAME | TIME OF OCCURENCE | TROUBLE NUMBER | LOCATION OF OCCURENCE | NOTIFICATION LEVEL | TRANSMISSION COMPLETE FLAG |
|---|---|---|---|---|---|---|
| MV-1 | MV | 07/17/2001 10:05:05 | EE1010 | - | | |
| MV-2 | MV | 07/17/2001 11:23:00 | ER1025 | Z23 | | |
| MPA-1 | MPA | 07/17/2001 12:20:30 | EE1010 | - | | |
| *** | *** | *** | *** | *** | | |
| *** | *** | *** | *** | *** | | |

FIG. 28B

| MACHINE TYPE NAME | TROUBLE NUMBER | NOTIFICATION LEVEL |
|---|---|---|
| MV | EE1010 | UNNECESSARY |
| MV | ER1025 | ALL |
| MPA | EE1010 | OPERATOR IN CHARGE |
| MPA | ER1011 | G1 |
| *** | *** | *** |

FIG. 28C

| JOB NAME | TARGET APPARATUS | NAME OF STAFF-IN-CHARGE | GROUP | TERMINAL NUMBER |
|---|---|---|---|---|
| OPERATION 1 | MV-1, MV-2 MPA-1 | A | G2 | 1 |
| COMPONENT REPLENISHMENT 1 | MV-1, MV-2 MPA-2 | B | G3 | 2 |
| *** | *** | *** | *** | *** |

FIG. 28D

| APPARATUS NAME | MACHINE TYPE NAME | TIME OF OCCURENCE | TROUBLE NUMBER | LOCATION OF OCCURENCE | NOTIFICATION LEVEL | TRANSMISSION COMPLETE FLAG |
|---|---|---|---|---|---|---|
| MV-1 | MV | 07/17/2001 10:05:05 | EE1010 | - | UNNECESSARY | |
| MV-2 | MV | 07/17/2001 11:23:00 | ER1025 | Z23 | ALL | TRANSMITTED |
| MPA-1 | MPA | 07/17/2001 12:20:30 | EE1010 | - | STAFF-IN-CHARGE A | TRANSMITTED |
| *** | *** | *** | *** | *** | | |
| *** | *** | *** | *** | *** | | |

Fig. 30A

| APPARATUS | TYPE | LINE TACT (SEC) | SUPPLY POSITION NUMBER | COMPONENT NUMBER | NUMBER OF COMPONENTS | INITIAL NUMBER | USED NUMBER | RESIDUAL NUMBER | RESIDUAL TIME (SEC) | TRANSMISSION TIME(sec) |
|---|---|---|---|---|---|---|---|---|---|---|
| MV-1 | MV | 30 | 1 | ERJ1011 | 8 | 10000 | 0 | 10000 | 37500 | |
| | | | 2 | ERJ1012 | 4 | 2550 | 0 | 2550 | 19125 | |
| | | | 10 | VCM0070 | 1 | 1000 | 0 | 1000 | 30000 | |
| MV-2 | MV | 30 | 1 | ECJ2010 | 2 | 4670 | 0 | 4670 | 70050 | |
| | | | 2 | EVD2010 | 1 | 3000 | 0 | 3000 | 9000 | |
| *** | *** | *** | *** | *** | *** | *** | *** | *** | *** | |

Fig. 30B

| APPARATUS | TYPE | SUPPLY POSITION NUMBER | USED NUMBER |
|---|---|---|---|
| MV-1 | MV | 1 | 4800 |
| | | 2 | 2400 |
| | | 10 | 600 |

Fig. 30C

| APPARATUS | TYPE | LINE TACT (SEC) | SUPPLY POSITION NUMBER | COMPONENT NUMBER | NUMBER OF COMPONENTS | INITIAL NUMBER | USED NUMBER | RESIDUAL NUMBER | RESIDUAL TIME (SEC) | TRANS-MISSION TIME(sec) |
|---|---|---|---|---|---|---|---|---|---|---|
| MV-1 | MV | 30 | 1 | ERJ1011 | 8 | 10000 | 4800 | 5200 | 19500 | |
| | | | 2 | ERJ1012 | 4 | 2550 | 2400 | 150 | 1125 | 1125 |
| | | | 10 | VCM0070 | 1 | 1000 | 600 | 400 | 12000 | |
| MV-2 | MV | 30 | 1 | ECJ2010 | 2 | 4670 | 1200 | 3470 | 52050 | |
| | | | 2 | EVD2010 | 1 | 3000 | 600 | 2400 | 72000 | |
| *** | *** | *** | *** | *** | *** | *** | *** | *** | *** | |

Fig. 30D

| APPARATUS | TYPE | LINE TACT (SEC) | SUPPLY POSITION NUMBER | COMPONENT NUMBER | NUMBER OF COMPONENTS | INITIAL NUMBER | USED NUMBER | RESIDUAL NUMBER | RESIDUAL TIME (SEC) | TRANSMISSION TIME(sec) |
|---|---|---|---|---|---|---|---|---|---|---|
| MV-1 | MV | 30 | 1 | ERJ1011 | 8 | 10000 | 4800 | 5200 | 19500 | |
| | | | 2 | ERJ1012 | 4 | 7550 | 2450 | 5100 | 38250 | |
| | | | 10 | VCM0070 | 1 | 1000 | 600 | 400 | 12000 | |
| MV-2 | MV | 30 | 1 | ECJ2010 | 2 | 4670 | 1200 | 3470 | 52050 | |
| | | | 2 | EVD2010 | 1 | 3000 | 600 | 2400 | 72000 | |
| *** | *** | *** | *** | *** | *** | *** | *** | *** | *** | |

Fig. 31A

| APPARATUS NAME | MACHINE TYPE NAME | NOZZLE NUMBER | NUMBER OF SUCTIONS | NUMBER OF MOUNTING | NUMBER OF SUCTION ERRORS | NUMBER OF VERTICAL SUCTION ERRORS | NUMBER OF RECOGNITION ERRORS | SUCTION RATE (%) | MOUNTING RATE (%) | TRANSMISSION CONDITION |
|---|---|---|---|---|---|---|---|---|---|---|
| MV-1 | MV | 1 | 2600 | 2585 | 6 | 2 | 7 | 99.6 | 99.4 | |
|  |  | 2 | 2600 | 2586 | 0 | 4 | 10 | 99.8 | 99.4 | |
|  |  | 10 | 2600 | 2599 | 1 | 0 | 0 | 99.9 | 99.9 | |
| MV-2 | MV | 1 | 2200 | 2198 | 1 | 0 | 1 | 99.9 | 99.9 | |
|  |  | 2 | 2200 | 2197 | 1 | 1 | 1 | 99.9 | 99.8 | |
| *** | *** | *** | *** | *** | *** | *** | *** | *** | *** | |

Fig 31B

| APPARATUS NAME | MACHINE TYPE NAME | INSPECTED QUANTITY | NUMBER OF INSPECTED POSITIONS | DEFECT QUANTITY | NUMBER OF DEFECTIVE POSITIONS | RATE OF DEFECTIVE SUBSTRATE (%) | RATE OF DEFECTIVE MOUNTING POSITION (%) | TRANSMISSION CONDITION |
|---|---|---|---|---|---|---|---|---|
| IP-1 | IPK | 1200 | 360000 | 3 | 8 | 0.25 | 0.002 | |
| IP-2 | IPJ | 1205 | 373550 | 13 | 20 | 1.00 | 0.005 | |
| *** | *** | *** | *** | *** | *** | *** | *** | *** |

Fig. 31C

| APPARATUS NAME | MACHINE TYPE NAME | NOZZLE NUMBER | NUMBER OF SUCTIONS | NUMBER OF MOUNTING | NUMBER OF SUCTION ERRORS | NUMBER OF VERTICAL SUCTION ERRORS | NUMBER OF RECOGNITION ERRORS | SUCTION RATE (%) | MOUNTING RATE (%) | TRANSMISSION CONDITION |
|---|---|---|---|---|---|---|---|---|---|---|
| MV-1 | MV | 1 | 2600 | 2585 | 6 | 2 | 7 | 99.6 | 99.4 | F |
|  |  | 2 | 2600 | 2586 | 0 | 4 | 10 | 99.8 | 99.4 | F |
|  |  | 10 | 2600 | 2599 | 1 | 0 | 0 | 99.9 | 99.9 |  |
| MV-2 | MV | 1 | 2200 | 2198 | 1 | 0 | 1 | 99.9 | 99.9 |  |
|  |  | 2 | 2200 | 2197 | 1 | 1 | 1 | 99.9 | 99.8 |  |
| *** | *** | *** | *** | *** | *** | *** | *** | *** | *** |  |

Fig. 31D

| APPARATUS NAME | MACHINE TYPE NAME | INSPECTED QUANTITY | NUMBER OF INSPECTED POSITIONS | DEFECT QUANTITY | NUMBER OF DEFECTIVE POSITIONS | RATE OF DEFECTIVE SUBSTRATE (%) | RATE OF DEFECTIVE MOUNTING POSITION (%) | TRANSMISSION CONDITION |
|---|---|---|---|---|---|---|---|---|
| IP-1 | IPK | 1200 | 360000 | 3 | 8 | 0.25 | 0.002 | |
| IP-2 | IPJ | 1205 | 373550 | 13 | 20 | 1.00 | 0.005 | J |
| *** | *** | *** | *** | *** | *** | *** | *** | *** |

Fig. 32A

| APPARATUS NAME | MACHINE TYPE NAME | PLANNED TOTAL QUANTITY | CURRENT TARGETED QUANTITY | PRODUCED/ INSPECTED QUANTITY | DIFFERENCE | TIME OF TRANSMISSION |
|---|---|---|---|---|---|---|
| MV-1 | MV | 7500 | 4900 | 4800 | -101 | |
| MV-2 | MV | 7500 | 4900 | 4798 | -102 | |
| IP-1 | IPK | 7500 | 4900 | 4790 | -110 | |
| *** | *** | *** | *** | *** | *** | |

Fig. 32B

| APPARATUS NAME | MACHINE TYPE NAME | PLANNED TOTAL QUANTITY | CURRENT TARGETED QUANTITY | PRODUCED INSPECTED QUANTITY | DIFFERENCE | TIME OF TRANSMISSION |
|---|---|---|---|---|---|---|
| MV-1 | MV | 7500 | 4900 | 4800 | -101 | 07/19/2001 10:15:17 |
| MV-2 | MV | 7500 | 4900 | 4798 | -102 | 07/19/2001 10:15:18 |
| IP-1 | IPK | 7500 | 4900 | 4790 | -110 | 07/19/2001 10:15:19 |
| *** | *** | *** | *** | *** | *** | *** |

PORTABLE TERMINAL AND MESSAGE NOTIFYING SYSTEM USING THE SAME

TECHNICAL FIELD OF THE INVENTION

The present invention relates to a portable terminal carried by an operator of a system used for mounting of components and the like. The present invention also relates to a message notifying system for sending to a portable terminal a message indicating the status of the system, etc.

BACKGROUND OF THE INVENTION

Various types of apparatuses for processing, assembling, chemical reactions, etc., conventionally comprise lamps for notifying an operator of the statuses of the apparatuses. For example, upon occurrence of stockout (out of stock) of components or trouble, a lamp of a predetermined color turns on to provide notification to an operator in charge of the apparatus.

In these years, there are a number of apparatuses available comprising displays showing various types of information for the purpose of advanced management of the apparatuses. When using such an apparatus, an operator can quickly grasp the operating status, the quantity of remaining components, the type of trouble and the like by looking at the display.

In addition, upon stockout of components in the apparatus or when it becomes necessary to replenish components, the operator confirms the quantity of remaining components which have been prepared in the vicinity of the apparatus, and if the quantity of remaining components is the same as or less than a predetermined quantity, the operator asks for an order for the components. A staff member in charge of order placement or the operator places an order for components, using a telephone, a facsimile machine, a computer or the like. Hence, for ordering of components, it becomes necessary for the operator to call up and communicate with the staff member in charge of order placement, or to move all the way to a location of a telephone, a facsimile machine, a computer or the like and place an order on his or her own.

When trouble arises in the apparatus, the operator moves to a location of a telephone, communicates with a variety of departments within a manufacturer in charge of designing the mechanism and the control of the apparatus and various relevant companies such as an after-sales service company, a sales company of components and manufacturers of measuring instruments attached to the apparatus, and discusses countermeasures with them. In this case, the operator must be away from his/her place of duty for a long period of time.

SUMMARY OF THE INVENTION

The present invention has been made in view of these problems, and aims at providing a portable terminal, a message notifying system and a message notifying process allowing an operator of an apparatus to efficiently obtain desired information without straying away from his/her place of duty.

To this end, a portable terminal carried by an operator of a target apparatus according to the present invention comprises:

communicating means for conducting wireless communication;

first information acquiring means for acquiring first information related to said target apparatus, from the target apparatus via the communicating means;

second information sending means for sending second information to at least one external information terminal via the communicating means based on the first information;

third information acquiring means for acquiring third information from the at least one external information terminal responding to the second information via the communicating means; and information outputting means for outputting information based on the third information.

A message notifying system according to the present invention is a message notifying system for detecting information created during a run of a production facility disposed for a production process for producing goods, and for notifying, in the form of a message, an operator of data identified as a target of notification based on the information. The system comprises:

an information receiver unit for receiving the information from the production facility;

an information summation unit for registering current state information representing the current state of the production facility, based on the information received by the receiver unit, and for selecting, as target data of notification, the current state information predictive of a halt of the production facility, before the production facility comes into a halt;

a data sending unit for sending the target data of notification selected by the information summation unit; and a data receipt notifying unit, carried by an operator, for receiving the target data of notification sent from the data sending unit, and for notifying the operator of the target data of notification.

A message notifying system according to another aspect of the present invention is a message notifying system for detecting information created during a run of a mounting facility disposed for an electronic component mounting step of mounting electronic components on a printed circuit board, and for notifying, in the form of a message, an operator of data identified as a target of notification based on the information. This system comprises:

an information receiver unit for receiving the information from the mounting facility;

an information summation unit for registering current state information representing the current state of the mounting facility, based on the information received by the information receiver unit, and for selecting the current state information predictive of a halt of the mounting facility, as target data of notification before the mounting facility comes into a halt; and a data sending unit for sending the target data of notification selected by the information summation unit.

A message notifying method according to the present invention is a message notifying method of message notifying system for detecting information created during a run of a production facility disposed for a production process for producing goods, and for notifying, in the form of a message, an operator of data identified as a target of notification based on the information. This method comprises:

an information receiving step of receiving the information from the production facility;

an information summation step of registering current state information representing the current state of the production facility, based on the information received at the information receiving step, and of selecting, as target data of notification, the current state information predictive of a halt of the production facility, before the production facility comes into a halt;

a data sending step of sending the target data of notification selected at the information summation step; and a data receipt notifying step of receiving the target data of notification sent at the data sending step, and of notifying the operator of the target data of notification, through the portable terminal carried by an operator.

A message notifying method according to another aspect of the present invention is a message notifying method for detecting information created during a run of a mounting facility disposed for an electronic component mounting step of mounting electronic components on a printed circuit board, and of notifying, in the form of a message, an operator of data identified as a target of notification based on the information. This method comprises:

an information receiving step of receiving the information from the mounting facility;

an information summation step of registering current state information representing the current state of the mounting facility, based on the information received at the information receiving step, and of selecting, as target data of notification, the current state information predictive of a halt of the mounting facility, before the mounting facility comes into a halt; and a data sending step of sending the target data of notification selected at the information summation step.

A message notifying program according to the present invention is a message notifying program executed by a computer and for detecting information created during a run of a production facility disposed for a production process for producing goods, and for notifying, in the form of a message, an operator of data identified as a target of notification based on the information. This program comprises:

an information receiving step of receiving the information from the production facility;

an information summation step of registering current state information representing the current state of the production facility, based on the information received at the information receiving step, and of selecting the current state information predictive of a halt of the production facility as target data of notification before the production facility comes into a halt;

a data sending step of sending the target data of notification selected at the information summation step; and a data receipt notifying step of receiving the target data of notification sent at the data sending step, and of notifying the operator of the target data of notification, through the portable terminal carried by an operator.

A message notifying program according to another aspect of the present invention is a message notifying program executed by a computer and for detecting information created during a run of a mounting facility disposed for an electronic component mounting step of mounting electronic components on a printed circuit board, and for notifying, in the form of a message, an operator of data identified as a target of notification based on the information. This program comprises:

an information receiving step of receiving the information from the mounting facility;

an information summation step of registering current state information representing the current state of the mounting facility, based on the information received at the information receiving step, and of selecting, as target data of notification, the current state information predictive of a halt of the mounting facility, before the mounting facility comes into a halt; and a data sending step of sending the target data of notification selected at the information summation step.

The present application is based on Japanese Patent Application Nos. 2001-257980, 2001-259280 and 2002-043035, which are incorporating herein by reference.

BRIEF DESCRIPTION OF THE DRAWINGS

FIG. 13A is a table showing an example of a trouble information management table;

FIG. 13B is a table showing an example of a notified trouble management table;

FIG. 13C is a table showing an example of a staff-in-charge management table;

FIG. 13D is a table showing an example of a trouble information management table;

FIGS. 15A and 15B are tables showing an example of the trouble information management table;

FIG. 16 is a table showing an example of an inquiry table;

FIGS. 18A, 18C and 18D are tables showing an example of a remaining quantity management table;

FIG. 18B is a table showing an example of quantity-in-use information;

FIGS. 20A to 20D are tables showing an example of a product quality information management table;

FIGS. 22A and 22B are drawings showing an example of a production progress information management table;

FIGS. 28A to 28D are tables showing an example of tables used in trouble notifying processing executed in the system shown in FIG. 24;

FIGS. 30A to 30D are tables showing an example of tables used in stockout warning processing executed in the system shown in FIG. 24;

FIGS. 31A to 31D are tables showing an example of tables used in quality notifying processing executed in the system 1 shown in FIG. 24; and FIGS. 32A and 32B are tables showing an example of tables used in progress notifying processing executed in the system shown in FIG. 24.

PREFERRED EMBODIMENTS OF THE INVENTION

Preferred embodiments of the present invention are described with reference to the associated drawings. A communication terminal, a message notifying system and a message notifying process according to the present invention are applied to a system for mounting a plurality of electronic components on a substrate in the preferred embodiments described below. However, these are also applicable to other systems, plants, etc.

A. First Preferred Embodiment

Figure 1:
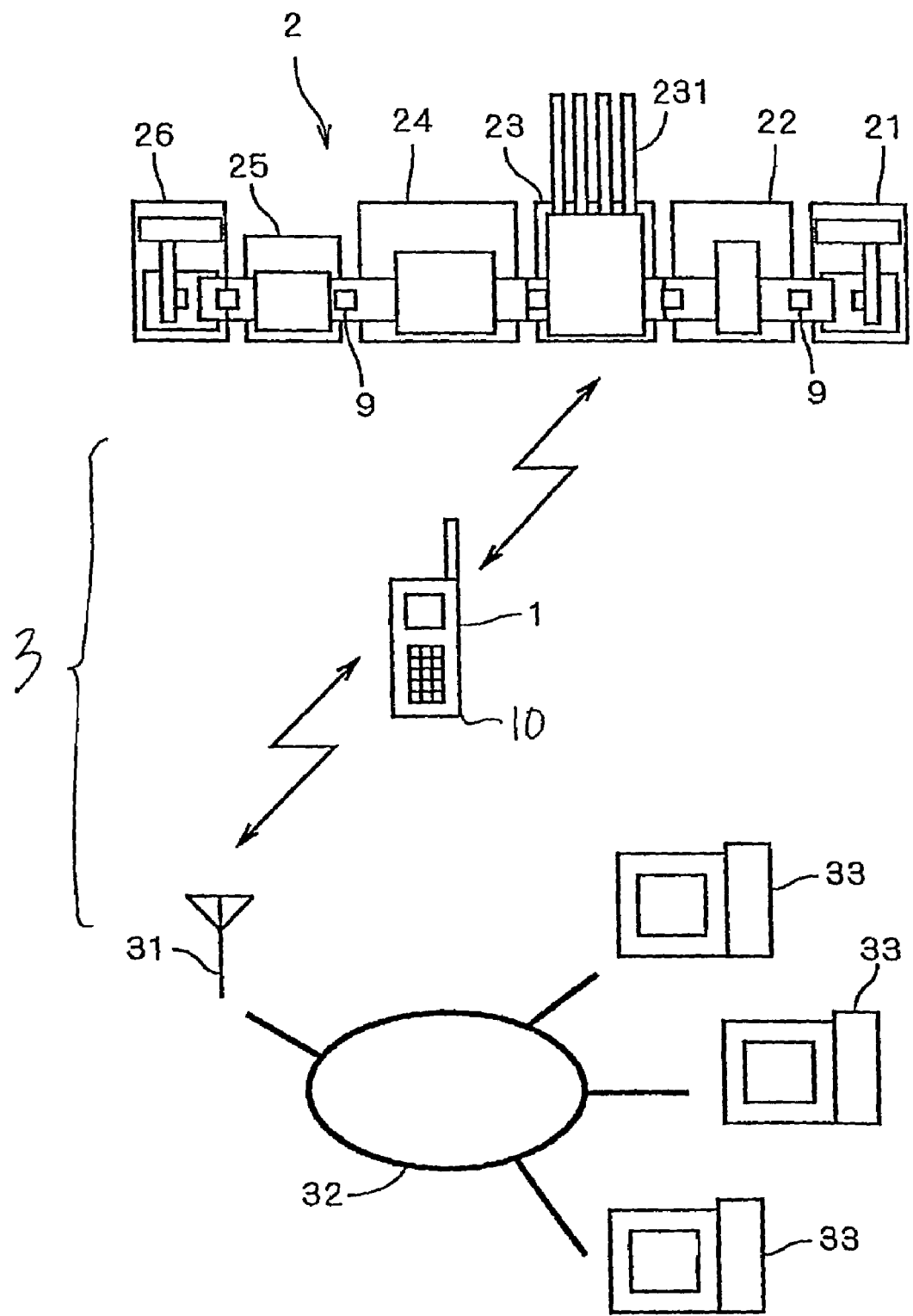
FIG. 1 shows a portable terminal according to a first preferred embodiment as it is in use.

FIG. 1 is a drawing showing an example wherein a portable terminal according to the present invention and a communication system using the same are applied to a mounting system. As shown in FIG. 1, a mounting system 2 comprises a plurality of apparatuses arranged in one row, such as a loader 21 for unloading substrates 9 out from a tray, not shown, for instance; a coating apparatus 22 for applying solder to the substrates; a mounting apparatus 23 for unloading electronic components out from one or more than one component supplying unit (that is, component cassettes) 231 and for mounting the electronic components on the substrates; a reflow apparatus 24 for heating up the solder applied to the substrates, cool it down and accordingly fix the electronic components to the substrates; an inspection apparatus 25 for inspecting the substrates having the components seated therein; and an unloader 26 for housing the component-seating substrates in a tray.

Figure 2:
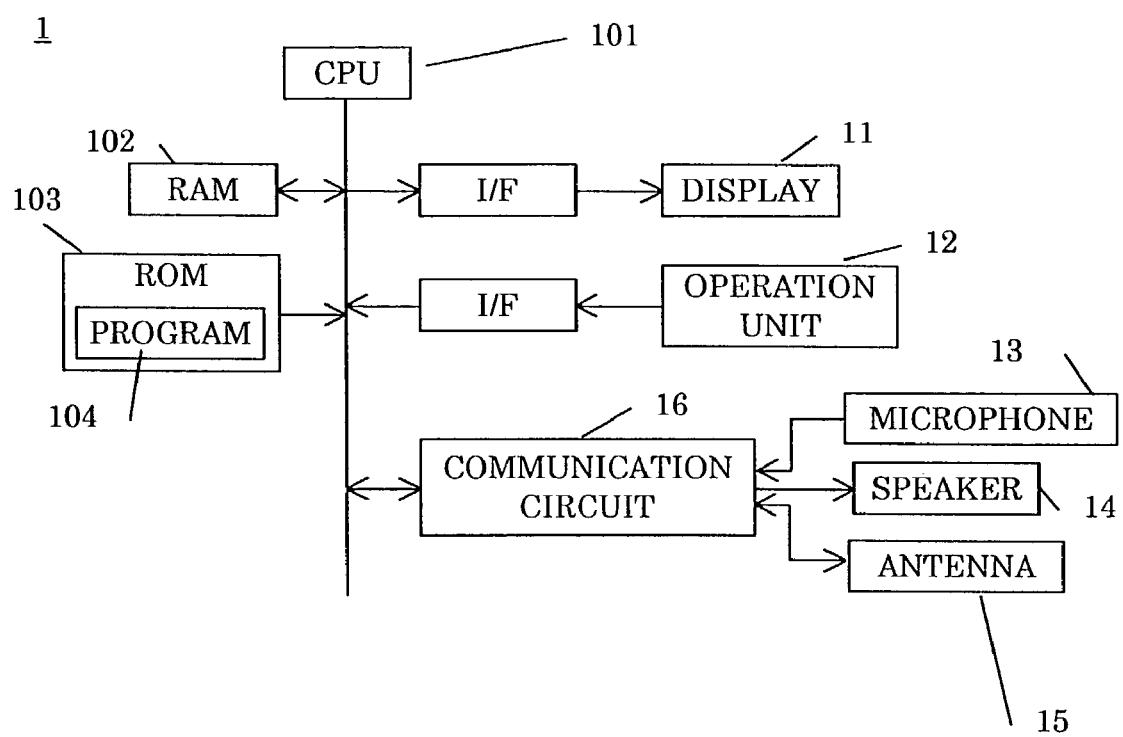
FIG. 2 is a block diagram showing a structure of the portable terminal.

A portable communication terminal (portable terminal) 1 used in a communication system 3 is carried by an operator of the mounting system 2. Like a mobile telephone such as a PHS (Personal Handyphone System) or a PDA (Personal Digital Assistant), as shown in FIG. 2, the portable terminal 1 comprises, within a housing 10 (see FIG. 1), a display 11 using a liquid crystal panel, for example, an operation unit 12 equipped with a plurality of input key switches, a microphone 13 and a speaker 14 for voice communication, a communication antenna 15, and a communication circuit 16 connected with the microphone 13, the speaker 14 and the antenna 15. Therefore, the portable terminal 1 is capable of wireless communication with communication facilities disposed in the mounting system 2, as well as with computers (information terminals 33) located inside or outside of one country via a fixed ground antenna facility 31 and a communication network 32, such as telephone lines and the Internet, as shown in FIG. 1.

Further, the portable terminal 1 comprises a CPU 101 for performing calculations, a RAM 102 and a ROM 103. These are connected with each other through appropriate interfaces. The CPU 101 is connected with the display 11, the operation unit 12 and the communication circuit 16 through appropriate interfaces. The ROM 103 consists of a non-volatile memory, for instance, and stores a program 104 for controlling calculations executed by the CPU 101.

Figure 3:
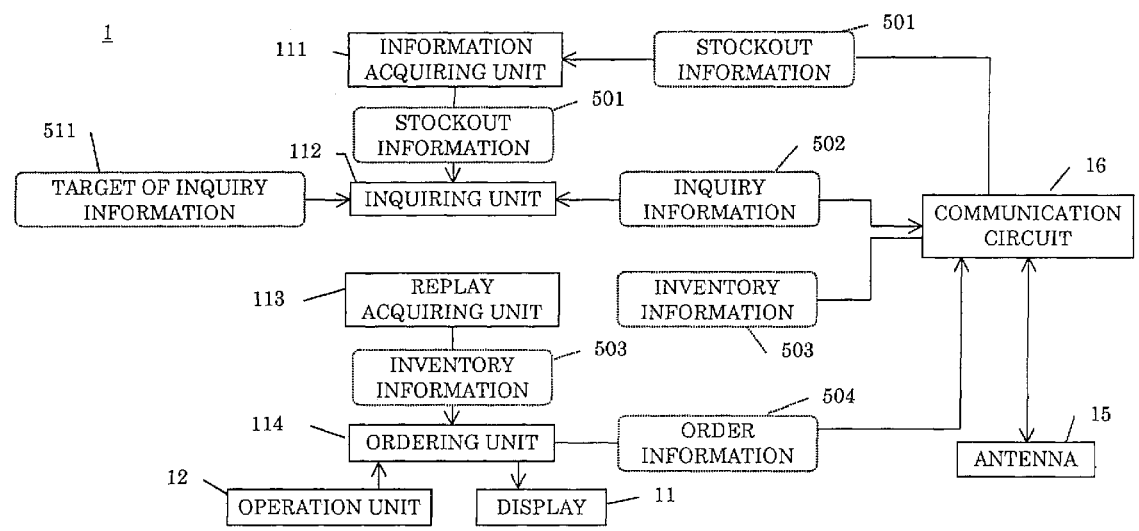
FIG. 3 is a block diagram showing a function realized by a CPU and the like, and other structure.
Figure 4:
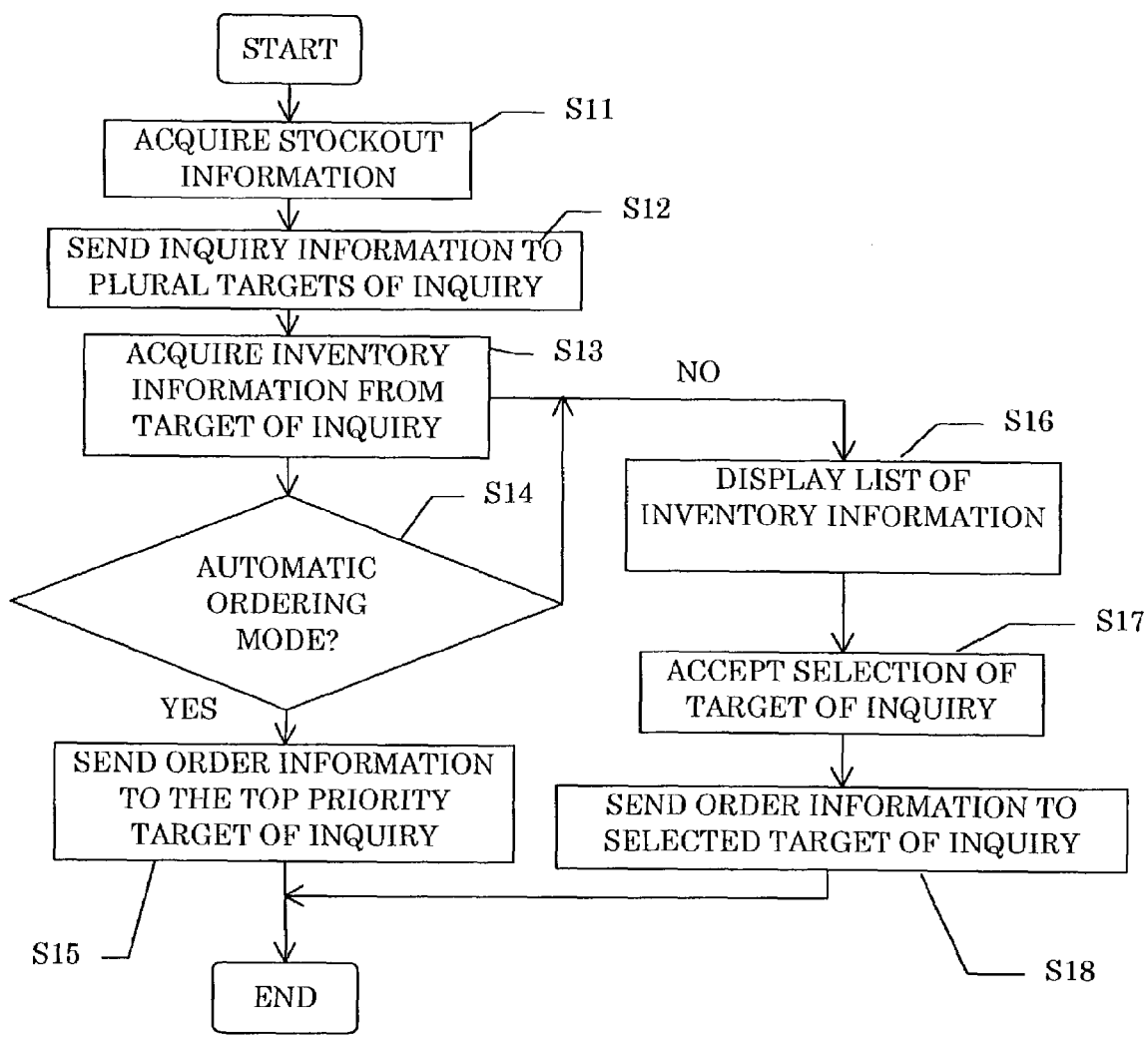
FIG. 4 is a flow chart showing one example of an operational sequence of the portable terminal.

FIG. 3 shows a plurality of functions to be realized through calculations executed by CPU 101 in accordance with the program 104, along with a part of a structure of the CPU 101. In FIG. 3, these functions are illustrated as an information acquiring unit 111, an inquiring unit 112, a reply acquiring unit 113 and an ordering unit 114. FIG. 4 is a flow chart showing one example of processing executed by the portable terminal 1. The processing is executed upon occurrence of stockout in one of the component cassettes 231 disposed to the mounting apparatus 23 of the mounting system 2, in order to place an order using the portable terminal 1 for procurement of a new component cassette 231. The outline of the processing executed by the portable terminal 1 is described with reference to FIGS. 3 and 4.

In this processing, as all or almost all components have been used from any one of the component cassettes 231 of the mounting apparatus 23, the mounting apparatus 23 transmits stockout information 501 to the portable terminal 1. The stockout information 501 indicates the occurrence of stockout and contains a component code relevant to the stockout. Via the antenna 15 and the communication circuit 16, the information acquiring unit 111 of the portable terminal 1 receives the transmitted stockout information 501 (Step S11). Thus received stockout information 501 is sent from the information acquiring unit 111 to the inquiring unit 112. The inquiring unit 112, referring to a database 511 regarding targets of inquiry (information terminals holding inventory information of components), specifies information on a party to receive an inquiry as for the inventory of the out-of-stock components (i.e., the information terminal of the party). Data on target parties of inquiry is stored in the RAM 102 in the form of a URL used on the Internet, for instance. Hence, the inquiring unit 112 can specify one or more target suppliers of the components, in accordance with the type of the out-of-stock components.

Thus acquiring the targets of the inquiry, the inquiring unit 112 sends inquiry information 502 to all of the acquired targets via the communication circuit 16 and the antenna 15 at step S12 (Step S12). The inquiry information contains the addresses (URLs) of the targets of the inquiry and the component code relevant to the stockout, and is sent on the communication network 32 to relevant information terminals 33.

Acquiring the inquiry information, each information terminal 33 responds to the inquiry to send back inventory information 503 on the components relevant to the inquiry to the portable terminal 1. The inventory information 503 may contain the date or the date and time of possible shipment and a management condition (the date and time of receipt, the environment of the storage place) of the in-stock components, in addition to the quantity of the in-stock components. The reply acquiring unit 113 of the portable terminal 1 acquires the inventory information 503 through the communication network 32, the antenna 15 and the communication circuit 16 (Step S13). The acquired inventory information 503 is transmitted to the ordering unit 114. The inventory information 503 is sent from more than one portable terminal 33 in some cases, and in other cases, plural pieces of inventory information 503 are sent from one information terminal 33. Hence, in general, the information acquired by the portable terminal 1 is an aggregation of plural pieces of information.

The ordering unit 114 may have two operation modes, one for automatically ordering components and the other for manually ordering components. In this case, an operator may select, by manipulating keys, either of the automatic ordering mode or the manual ordering mode. Further, the automatic ordering mode may be provided with a function of prioritizing a plurality of targets of inquiry in advance and automatically placing an order for components to the target given the top priority among the plurality of those having returned answers of holding inventories. In the event that the portable terminal 1 comprises this prioritized ordering function, as it is judged that the automatic ordering mode is in action (Step S14), the ordering unit 114 sends out order information 504 containing information such as a code specifying the ordered components, the ordering quantity, and the time and date of receipt, to the information terminal 33 of the target of inquiry given the top priority via the communication circuit 16 and the antenna 15 (Step S15). This achieves automatic ordering of components through the communication network 32. In the event that there are a plurality of storage places within one target of inquiry, the order information contains information regarding the plurality of storage places as well.

Under the manual ordering mode, the display 11 of the portable terminal 1 shows the inventory information 503 containing all targets of inquiry having inventories of the components (Step S16). At this stage, it is preferable that the speaker 14 outputs speech as the inventory information 503 is displayed. Next, when the operator manipulates the keys of the operation unit 12 to designate one or more targets of order from the plurality of information terminals 33 shown on the display 11, the ordering unit 114 registers the designated information terminals 33 (Step S17). The ordering unit 114 thereafter sends the order information 504 to the designated information terminals 33 (Step S18).

In this manner, in the system described above, the stock-out information from the mounting apparatus 23 is automatically fed to the portable terminal 1, and the inventory of the out-of-stock components is automatically inquired based on the inputted information. Further, the targets of order are designated automatically or manually by the operator, and an order for the components is placed to the designated targets of order from the portable terminal. This eliminates the necessity for the operator of the mounting apparatus to move all the way to the location of a telephone, a facsimile machine and a computer. In addition, the operator can place an order for the components without communicating with an ordering staff member. As a result, the working efficiency of the operator further improves.

B. Second Preferred Embodiment

Figure 5:
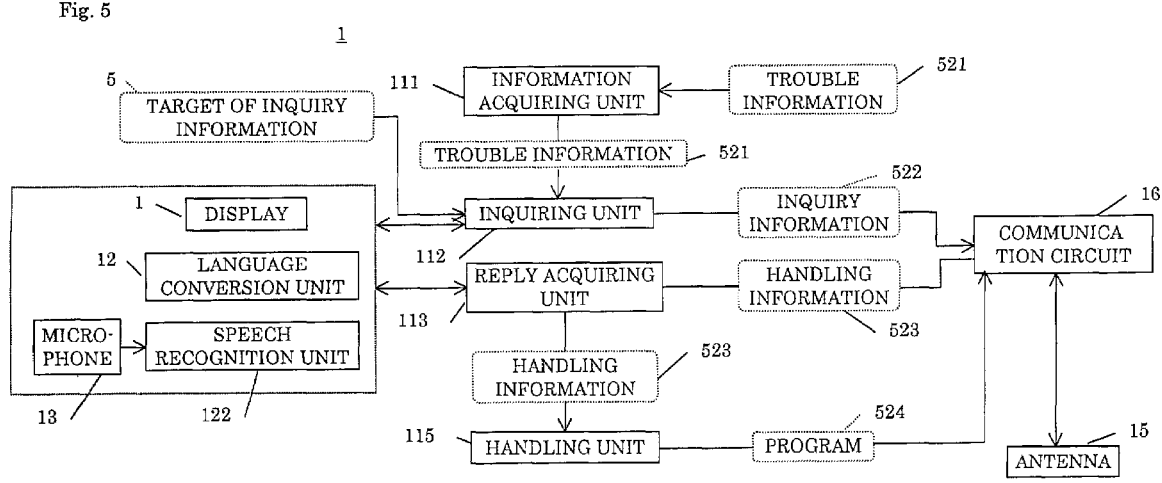
FIG. 5 is a block diagram showing a function realized by a CPU and the like of a portable terminal according to a second preferred embodiment, and other structure.

A system for using a trouble handling method by means of the portable terminal 1 is described with reference to FIG. 5 showing various functions executed by the portable terminal 1. As shown in FIG. 5, the portable terminal 1 comprises a plurality of functioning portions realized by the CPU 101, namely, the information acquiring unit 111, the inquiring unit 112, the reply acquiring unit 113, a handling unit 115, a language conversion unit 121 and a speech recognition unit 122. As trouble occurs in the mounting system, the portable terminal 1 having such a structure performs processing shown in the flow chart in FIG. 6 (trouble handling).

Each apparatus in the mounting system 2 comprises a plurality of sensors for the purpose of this trouble handling, and the sensors detect the statuses of the system and each apparatus. As output from the sensors exceeds a predetermined threshold value, trouble is detected. As a result, the communication apparatus (computer) of the apparatus comprising the sensor having detected the trouble or a computer managing the mounting system sends out trouble information. The trouble information is received by the information acquiring unit 111 through the antenna 15 and the communication circuit 16 of the portable terminal 1 (Step S21).

The trouble information received in this manner preferably contains, as information needed to identify a handling method suitable for the content of the trouble, the output from the sensor having detected the trouble. For instance, when an abnormal air pressure within a nozzle sucking electronic components in the mounting apparatus 23 is detected, it is preferable that information such as the air pressure, an image of the nozzle sucking the components and the brightness of lighting for shooting the image is sent to the portable terminal 1. It is also preferable that information such as an internal temperature of the reflow apparatus 24, the version of a temperature control program and an image of the adhesive defect is sent to the portable terminal 1 when a camera of the inspection apparatus 25 disposed on the downstream side to the reflow apparatus 24 detects an adhesive defect on a component.

The trouble information 521 received in this manner is sent to the inquiring unit 112 from the information acquiring unit 111. Referring the database 511 about targets of inquiry (information terminals of the party to ask about a trouble handling method), the inquiring unit 112 extracts all appropriate targets of inquiry based on the type or content of the trouble. To this end, the database 511 contains tables associating the types of troubles with targets of inquiry. In the event that there is more than one target of inquiry registered for one trouble, priorities are set for the plurality of the targets.

In the portable terminal 1, whether an inquiry upon occurrence of trouble is to be made automatically or manually is set. Either the automatic inquiry mode or the manual inquiry mode may be selected through a key manipulation by the operator. Under the automatic inquiry mode, when a plurality of targets of inquiry are selected, an inquiry is made to the target of inquiry given the top priority among the plurality of the targets. Alternatively, inquiries may be made in the order of descending priorities. In the event that there are a plurality of targets of inquiry given the top priority, inquiries are made to the plurality of the targets.

When the automatic mode is in action, the inquiring unit 112 creates inquiry information 522 containing a content necessary to identify a handling method (Step S22). Thus created inquiry information 522 is sent via the communication circuit 16 and the antenna 15. The transmitted inquiry information 522 is received by the information terminals 33 of the targets of inquiry via the antenna facility 31 and the communication network 32 shown in FIG. 1 (Step S23).

When the manual inquiry mode is in action, a plurality of targets of inquiry are displayed on the display 11 of the portable terminal 1 (Step S24). At this stage, the portable terminal 1 outputs speech from the speaker 14 and notifies the operator of occurrence of trouble. Looking at the inquiry information 522 displayed on the display 11, the operator manipulates the keys of the operation unit 12 and selects one or more targets of inquiry from the plurality of the targets displayed on the display 11. In the event that the portable terminal 1 comprises the speech recognition unit 122, it is possible to select the target of inquiry by means of speech inputted via the microphone 13.

When the target of inquiry is selected by means of speech, the speech recognition unit 122 recognizes the target of inquiry (Step S25). Of course, it is possible to select a plurality of targets of inquiry. Next, the inquiring unit 112 sends the inquiry information 522 to the selected target of inquiry (Step S26). In this manner, the operator selects the target of inquiry and makes an inquiry without providing any manual manipulation.

In the event that the target of inquiry is an information terminal installed in a foreign country where a different language is used, text information contained in the inquiry information 522 is sent to the language conversion unit 121, and the text information is converted (translated) into the corresponding foreign language. This makes it possible to make a proper inquiry to the information terminal installed in the foreign country.

Receiving the inquiry information 522, the information terminal 33 automatically prepares information 523 containing the trouble handling included in the inquiry information 522. At this stage, the information terminal 33, using a key word contained in the inquiry information 522, searches for an appropriate handling method from the database. For instance, when the brightness of a lighting apparatus disposed to confirm suction of electronic components in the mounting apparatus is abnormal, the database is searched for and the handling information 523 containing handling methods such as "Clean the lamp," "Replace the lamp" and "Replace the fuse" is created.

The handling information 523 may be prepared manually by the operator of the information terminal 33. In this case, output from one or more sensors of the mounting system 2 contained in the inquiry information is displayed on the information terminal 33. The operator then analyzes or studies the content displayed on the information terminal 33 and prepares the handling information 523. For example, when the nozzle of the mounting apparatus 23 can not properly suck electronic components, the inquiry information 522 contains image data shot by the camera of the mounting apparatus 23 to represent the condition of suction of the electronic components. This image is then displayed on the display of the information terminal 33. Looking at the image displayed on the display, the operator searches for the cause of the abnormal suction and creates the handling information 523 containing handling methods for removal of the cause such as "Increase the air pressure of suction", "Download the program for decreasing the speed of the head" and "Download the program for changing the suction position."

Depending on the handling methods, the handling information 523 contains a program for controlling the loader 21, the coating apparatus 22, the mounting apparatus 23, the reflow apparatus 24, the inspection apparatus 25 and/or the unloader 26. The program is downloaded to a computer controlling the mounting system as a whole or to each one of these respective apparatuses. In addition, for the purpose of specifically showing the content of a job to the operator of the mounting system, data of an image expressing the content of the job may be included in the handling information.

The reply acquiring unit 113 of the portable terminal 1 acquires the handling information 523 thus prepared by the information terminal 33, via the communication network 32, the antenna facility 31, the antenna 15 and the communication circuit 16 (Step S27). The handling information 523 is sent from a plurality of targets of inquiry in some cases, and transmission of a plurality pieces of handling information 523 comes from one target of inquiry in other cases. Hence, the portable terminal 1 may acquire more than one piece of handling information. The handling information thus fed to the portable terminal 1 is sent to the handling unit 115.

The handling information 523 received by the handling unit 115 is then sent to the mounting system 2. The handling information 523 may be shown on the display 11 of the portable terminal 1. The portable terminal 1 preferably has an automatic transmission mode for automatically selecting handling information and a manual transmission mode for manually selecting handling information to send the handling information. It is preferable that these transmission modes are switched with each other as the operator manipulates the keys of the operation unit 12.

When the automatic transmission mode is in action, the handling information received by the handling unit 115 is automatically sent to the mounting system 2 or the apparatuses installed in the mounting system 2. At this stage, if the plurality of pieces of handling information are given priority, the handling information having the top priority is automatically selected to be sent (Steps S31 and S32).

In contrast, when the manual transmission mode is in action, the operator can make a selection from the plurality of pieces of handling information 523 shown on the display 11 by manipulating the keys of the operation unit 12 (Step S33). The handling information 523 may be selected by means of speech input. In this case, the speech recognition unit 122 specifies the designated handling information based on the speech inputted through the microphone 13 (Step S34).

Next, whether the selected handling information 523 is a program to be executed by the mounting system 2 is confirmed (Step S35). When the handling information is not a program, the selected handling information 523 is shown on the display 11 of the portable terminal 1 (Step S36). When the handling information 523 contains images representing handling methods, the images are displayed on the display. The operator therefore can visually grasp the handling methods. When the handling information 523 contains foreign language text, the text is translated by the language conversion unit 121 into a language used by the operator and displayed on the display 11.

When the handling information 523 contains a program 524, the program 524 is sent to the mounting system 2 from the handling unit 115 via the communication circuit 16 and the antenna 15 and downloaded to the mounting system or a control unit of the apparatuses to solve the trouble (Step S37).

As described above, according to the portable terminal and the communication system above, upon occurrence of trouble in the mounting system, an inquiry about a trouble handling method is made from the portable terminal via the communication network by means of automatic or manual (speech-based) selection. Further, a reply sent back from the information terminal, namely, the handling information, is displayed on the portable terminal. This makes it possible for the operator to make an inquiry about a trouble handling method without moving all the way to the location of a telephone, a personal computer or the like.

In addition, when the handling information sent from the information terminal contains a program, the program is downloaded to the mounting system; that is, the portable terminal uploads the program to the mounting system. Hence, it is possible to update the program in the mounting system without requiring any special knowledge about computers.

Further, the operator can select a target of inquiry or handling information by inputting speech, instead of manipulating the keys on the portable terminal.

Still further, when a target of inquiry is an information terminal in a foreign country, information inputted in the language of the operator is automatically converted by the language conversion unit into the language used in the country of the information terminal. Therefore, the respective operators can easily understand inquiries and handling methods and take proper actions.

As described above, use of the communication system above significantly simplifies an operator's job upon occurrence of trouble in a production system, as well as allowing to quickly deal with the trouble.

While the foregoing has described the first and the second preferred embodiments in relation to a plurality of processing using the portable terminals, the present invention is not limited to these preferred embodiments, but may be modified in various manners.

For instance, the portable terminal may acquire information from each apparatus of the mounting system, or from a computer for controlling the mounting system as a whole.

Further, the portable terminal may communicate with another neighboring production line and apparatus installed in a nearby factory.

In addition, a system applicable to the communication system may be any system requiring an operator, and is not limited to a production facility for processing or assembling. Applications include use in a chemical plant, power equipment and a construction site.

C. Third Preferred Embodiment

A message notifying system according to the present invention is described below. This system, as shown in FIG. 8, consists of a component mounting system for mounting a plurality of electronic components on a substrate, for instance, one or more portable terminals and one or more information terminals located in remote places.

Figure 8:
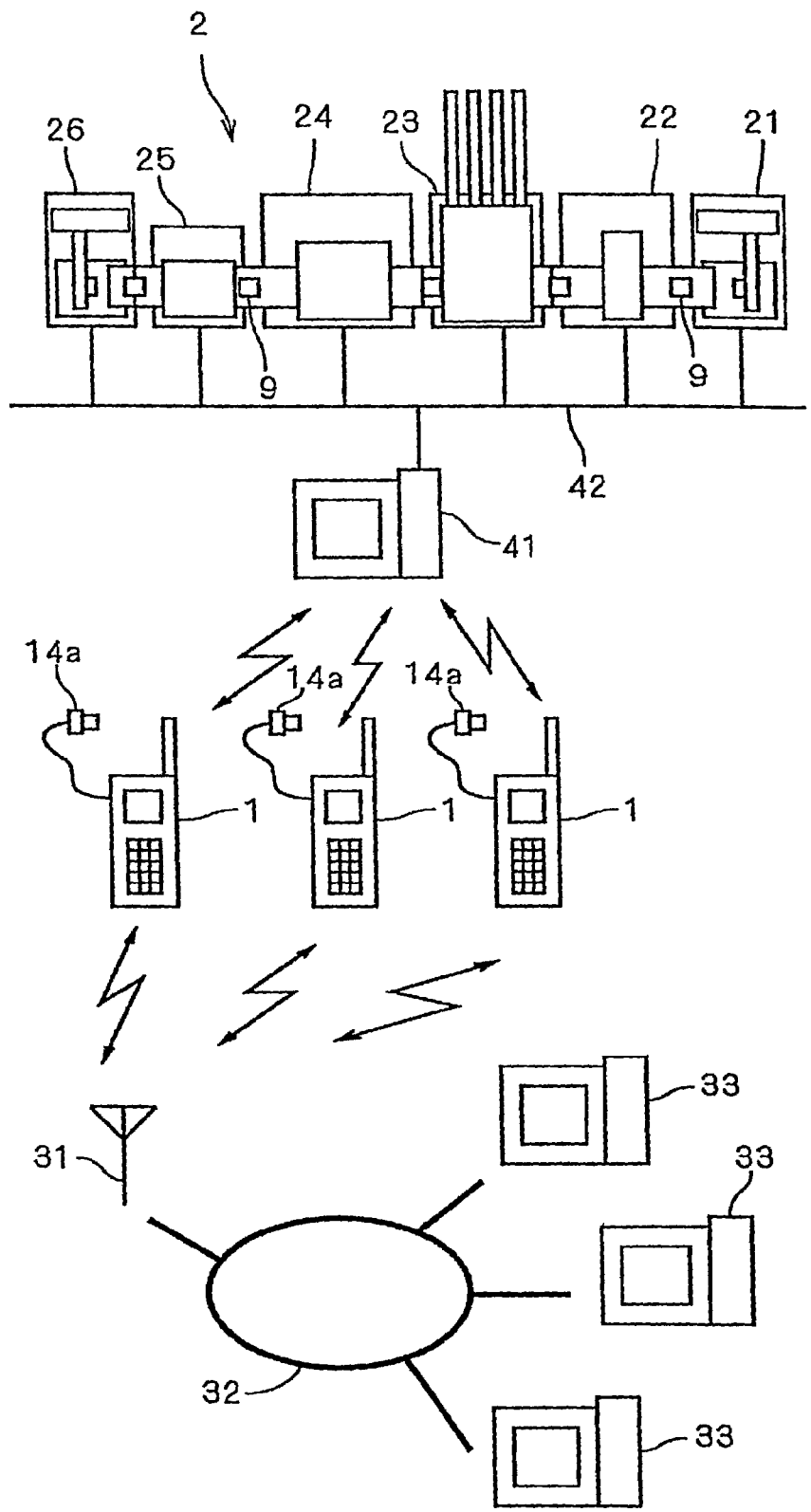
FIG. 8 shows a portable terminal according to a third preferred embodiment as it is in use.

First, as shown in FIG. 8, the mounting system 2 comprises the loader 21, the coating apparatus 22, the mounting apparatus 23, the reflow apparatus 24, the inspection apparatus 25 and the unloader 26. These apparatuses are connected, wireless or by cable, with a system controller 41 so as to communicate via a network 42.

The system controller 41 is capable of communicating with one or more portable terminals 1. As in the preferred embodiments described above, mobile telephones (e.g., PHS mobile telephones) or PDAs may be used as the portable terminals 1. It is preferable to use, as the portable terminals 1, apparatuses equipped with a function of automatically receiving a signal sent from the system controller 41 without any action made by an operator (such as pressing a receive key disposed to the portable terminal 1). In this case, for the operators to recognize received messages without fail, the portable terminals 1 preferably comprise earphone-type electro-acoustic transducers 14a.

Figure 9:
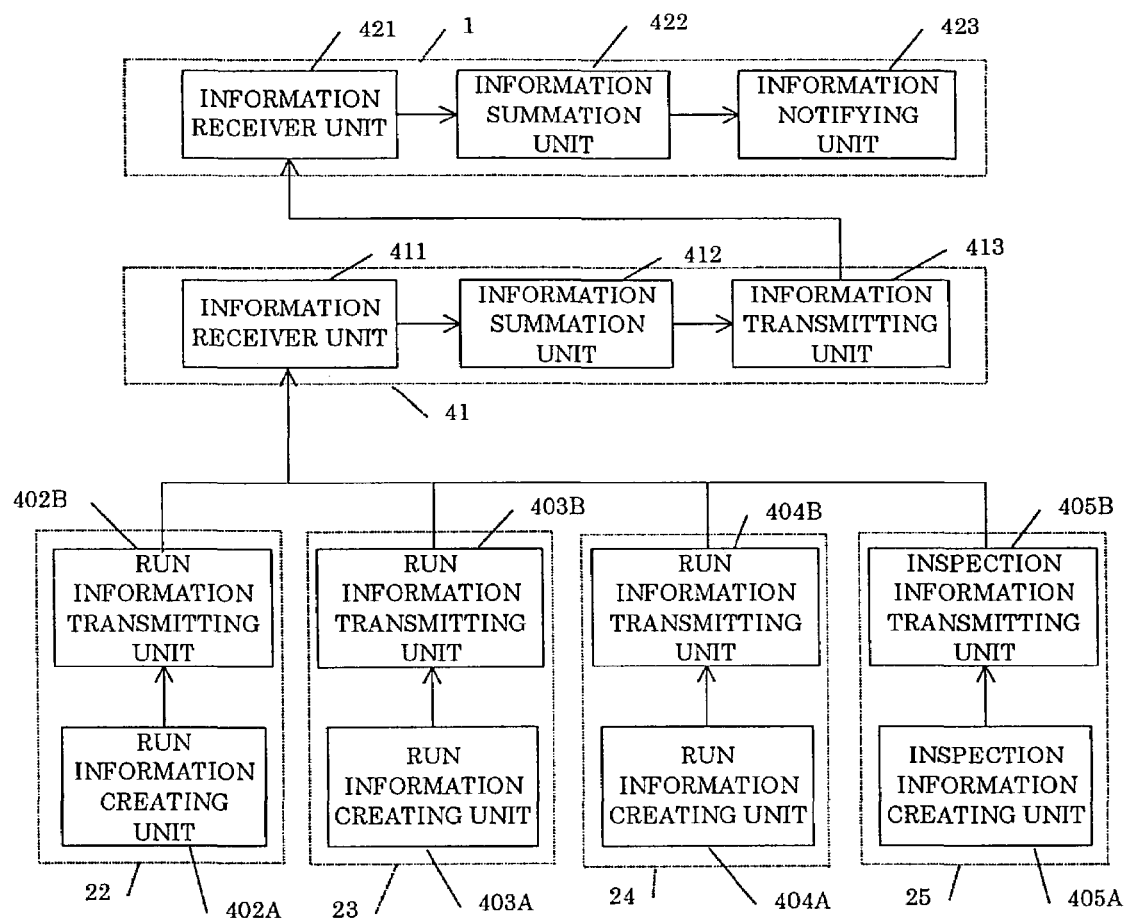
FIG. 9 is a block diagram showing functions of a mounting system, a server and the portable terminal according to the third preferred embodiment.

A structure of the message notifying system is described with reference to FIG. 9. As shown in FIG. 9, the apparatuses 22 through 24 of the mounting system 2 respectively comprise information creating units 402a through 404a for creating information representing operation statuses of the respective apparatuses and information transmitting units 402b through 404b for outputting the information created in the information creating units. In a similar manner, the inspection apparatus 25, as well, comprises an information creating unit 405a and an information transmitting unit 405b. For simplicity of illustration, FIG. 9 does not show the loader 21, and an information creating unit and an information transmitting unit included in the loader 21. The system controller 41 comprises: a receiver unit (inputting unit) 411 for receiving a signal sent from the mounting system 2 via the network 42; an information summation unit 412 for processing the signal received by the receiver unit 411 and creating an output signal; and a transmitting unit (outputting unit) 413 for outputting the signal created in the information summation unit 412. In a similar manner, each portable terminal 1 comprises a receiver unit (inputting unit) 421 for receiving a signal output from the transmitting unit 413 of the system controller 41, an information summation unit 422 for processing the signal received at the receiver unit 421 and creating an output signal, and a notifying unit (outputting unit) 423 for outputting, by means of speech and/or image, a message corresponding to the signal received at the receiver unit 421. In the third preferred embodiment, the receiver unit 421 functions as the information acquiring unit 111 and the reply acquiring unit 113 described earlier. Meanwhile, the information summation unit 422 functions as the inquiring unit 112, the ordering unit 114 and the handling unit 115. Further, the notifying unit 423 corresponds to the display 11 and the electro-acoustic transducer 14a.

In such a structure, information associated with operations of the apparatuses 22 through 25 are created in the information creating units 402a through 405a, sent out from the information transmitting units 402b through 405b through the network 42, and received by the receiver unit 411 of the system controller 41. The system controller 41 processes signals thus received at the receiver unit 411. At this stage, a correlation between the signals output from the plurality of apparatuses 22 through 25 is also calculated. A signal created at the information summation unit 412 is then sent to the portable terminals 1 through the transmitting unit 413, if necessary.

The portable terminals 1 automatically receive at their receiver units 421 the information sent from the system controller 41. After the received signals are processed in the information summation units 422, necessary information is sent from the notifying units 423. Further, based on the signals output from the information summation unit 422, necessary information is displayed on the displays 11 and output in the form of speech from the electro-acoustic transducers 14a.

Figure 10:
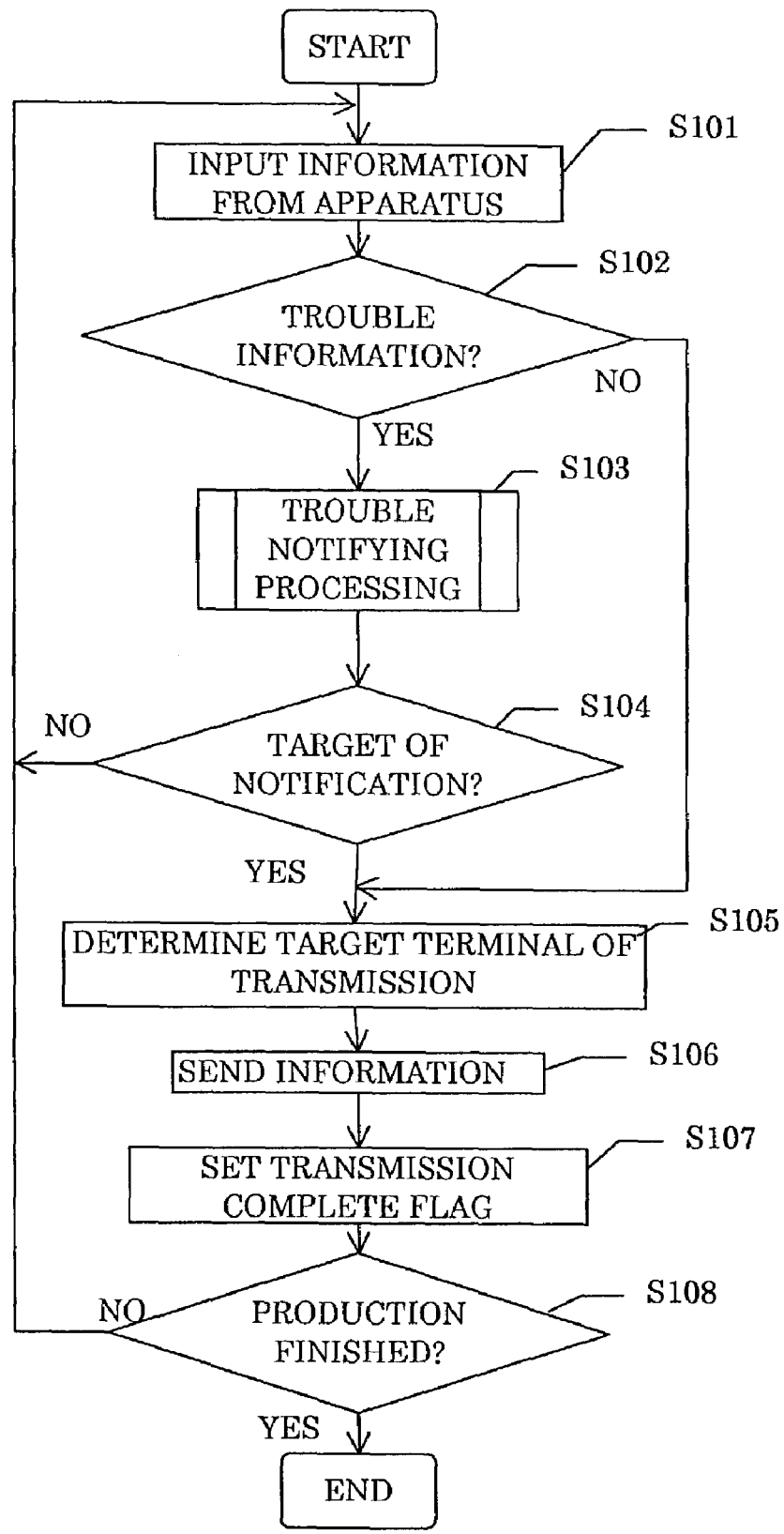
FIG. 10 is a flow chart showing an operational sequence of the server.

FIG. 10 shows a sequence of processing executed by the system controller 41. As shown in FIG. 10, the signals output from the apparatuses 22 through 25 on the network 42 are fed to the receiver unit 411 (Step S101). The signals received at the receiver unit 411 are sent to the information summation unit 412 and whether the signals are trouble information is determined (Step S102). When the signals are trouble information, processing for notifying the portable terminals 1 of the expressed trouble is performed (Step S103). Whether the trouble information should be notified to the portable terminals 1 is then determined (Step S104). If the trouble information needs to be notified to the portable terminals 1 or if the received signals are something other than trouble information, the portable terminal 1 to receive this information is identified (Step S105). Then, the information is sent to the identified portable terminal 1 (Step S106). As the information is sent to the identified portable terminal 1, a transmission complete flag is activated (Step S107). When a transmission flag is activated, whether production has finished is determined (Step S108). If the production is not finished yet, the processing above is repeated again.

Figure 11:
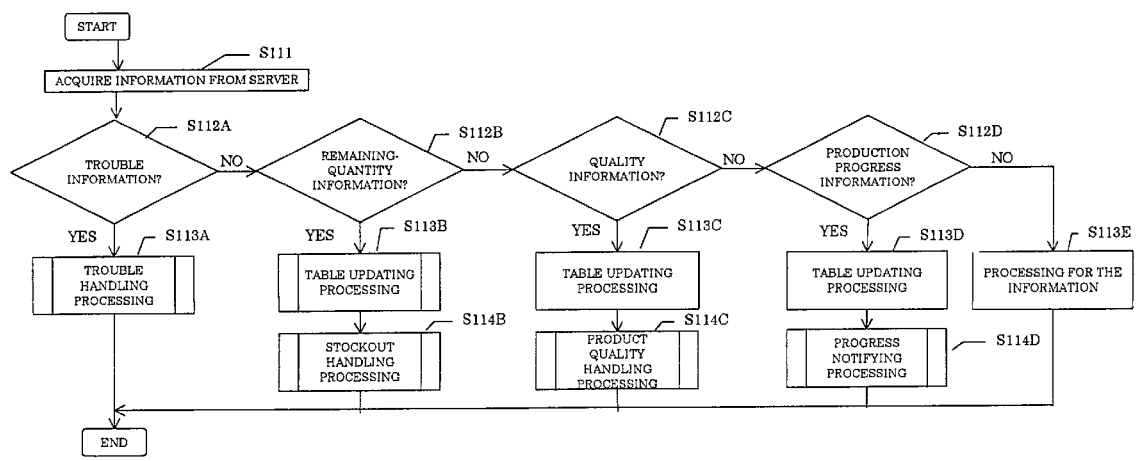
FIG. 11 is a flow chart showing operational sequences of the portable terminal.

FIG. 11 is a flow chart of processing in the portable terminal 1 after reception of the signal transmitted from the system controller 41. As shown in FIG. 11, the receiver unit 421 of the portable terminal 1 receives the information (signal) sent from the system controller 41 (Step S111). The received information is sent to the information summation unit 422. The information summation unit 422 judges which one of the following information the received information corresponds to: information about trouble in the apparatuses; information about the quantity of remaining components in the mounting apparatus; information about the capabilities of the apparatus (product quality); or a signal about production progress information (productivity) on the apparatuses (Steps S112a to S112d). Then, the information summation unit 422 executes corresponding processing based on the judgment (Steps S113a to S113d, S114b to S114d). When the received information corresponds to none of these, processing corresponding to such information is carried out (S113e) Operations of the system controller 41 and the portable terminal 1 in accordance with the content of information are described in detail below.

Notification of Trouble

Figure 12:
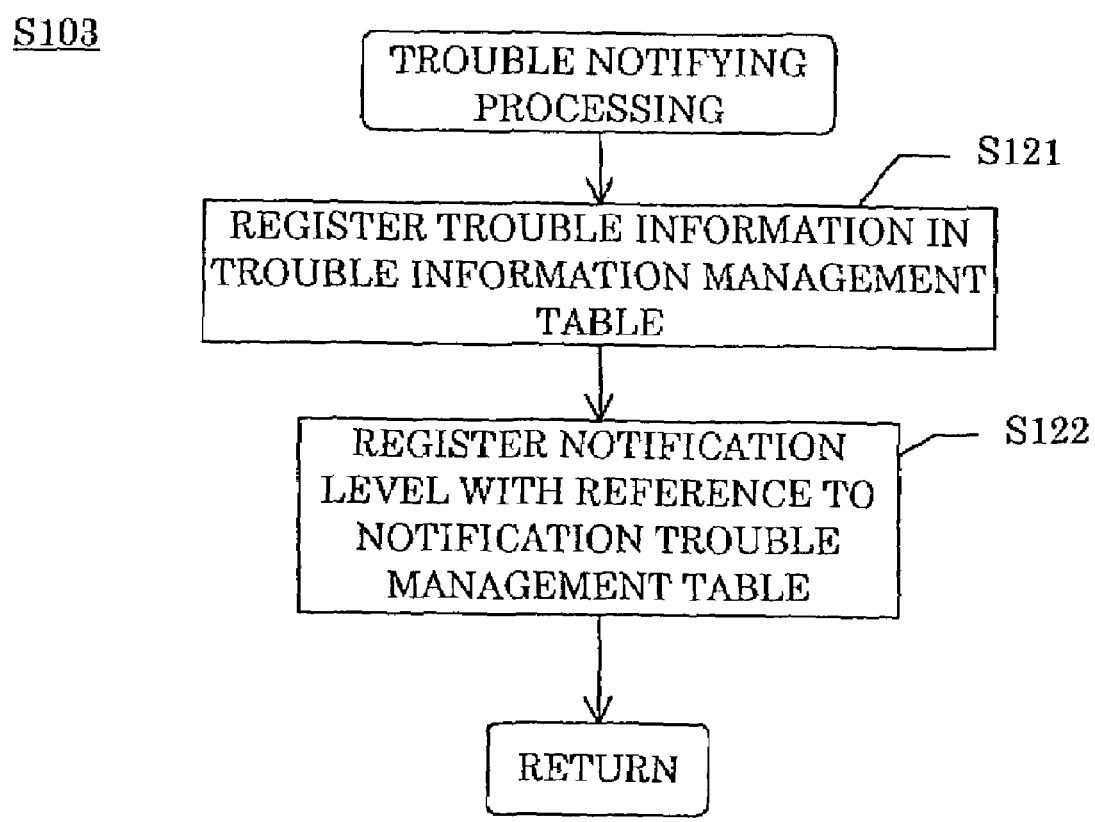
FIG. 12 is a flow chart showing a sequence of trouble notifying processing.

As the system controller 41 receives trouble information, the information summation unit 412 executes trouble notifying processing (Step S103 in FIG. 10). Details of the processing at this stage are as follows. First, the information summation unit 412 acquires the trouble information and registers this information in a trouble management table, shown in FIG. 13A (Step S121 in FIG. 12). Then, referring to management tables shown in FIGS. 13B and 13C, it registers a notification level representing which party (portable terminal or operator) should be notified upon occurrence of trouble in the trouble management table shown in FIG. 13A (Step S122 in FIG. 12).

The trouble information contains individual apparatus codes assigned to the respective apparatuses, machine type codes expressing the types of the respective apparatuses, the time of the trouble occurrence, a trouble code expressing the content of the trouble, and the place of the trouble occurrence.

"Notification levels" in the trouble management table shown in FIG. 13A are determined in advance based on the machine type codes and the trouble codes as shown in the trouble table shown in FIG. 13B. As illustrated, the notification levels are classified into: "UNNECESSARY" meaning that "no message to be transmitted"; "ALL", "a message needs to be transmitted to all operators (portable terminals)"; "OPERATOR IN CHARGE", "a message needs to be transmitted to an operator in charge (portable terminal)"; and "GROUP", "a message needs to be transmitted to all operators in a group-in-charge (portable terminals)."

The trouble table, shown in FIG. 13C, stored in the information summation unit 412 includes relationships between groups to be notified and operators and portable terminals belonging to the groups. As a particular group is chosen from the management table, operators or portable terminals belonging to this particular group are specified. The specified operators, portable terminals or group are entered in the notification level cells in the management table. As shown in FIG. 13C, the management table includes such items as jobs, apparatus codes, operator codes and group codes. As illustrated, particular jobs (e.g., manipulations of apparatuses, replenishment of components, maintenance and inspection) are assigned to each operator. Meanwhile, the groups are aggregations of the plurality of operators in charge of a specific job, and not determined depending on the apparatus each operator handles. Further, one operator is associated with one portable terminal in some cases (that is, one operator always carries a particular portable terminal), and in other cases, a plurality of operators working in shifts carry one portable terminal in turn. In the latter case, operator codes may be registered in the management table at the start of the shift. The relationships between the groups and the operators included in the groups may be updated if necessary.

In the transmission flag cell in the management table, the transmission complete flag representing transmission of a message is registered after transmission of a message to a particular target of transmission based on processing described later. For reference, FIG. 13D shows a management table 54 where the notification level and the transmission complete flag have been registered.

Back to FIG. 10, the information summation unit 412, referring to the trouble information and the notification level registered in the trouble management table, determines whether the trouble information is a target item to be notified to the portable terminals (Step S104). When the trouble information is a target of notification, the portable terminal 1 to be a target of transmission is determined, and necessary information is sent to this portable terminal 1 from the transmitting unit 413 (Steps S105, S106). When the notification level is "UNNECESSARY" or when the transmission complete flag has been already registered, no notification is made. The information sent from the transmitting unit 413 contains an apparatus code relevant to the trouble, a trouble code, the time of the trouble occurrence and others (including the cause of the trouble, the relationships with other apparatuses and an image of the condition of the trouble). Such information may be either text data or image data (of a still image or a moving image).

Upon transmission of the information from the transmitting unit 413, the information summation unit 412 registers the transmission complete flag for the information (Step S107 in FIG. 13D). This operation is repeated until production in the mounting system 2 has completed.

On the other hand, as shown in FIG. 11, the portable terminal 1 receives at its receiver unit 421 the information sent from the system controller 41 (Step S11). At this stage, the receipt by the portable terminal 1 takes place automatically, without any receiving action by the operator such as pressing of a receive key. The receiver unit 421 then sends the received information to the information summation unit 422. The information summation unit 422 determines whether the received information is trouble information (Step S112a), and executes trouble handling processing if the received information is trouble information (Step S113a).

Figure 14:
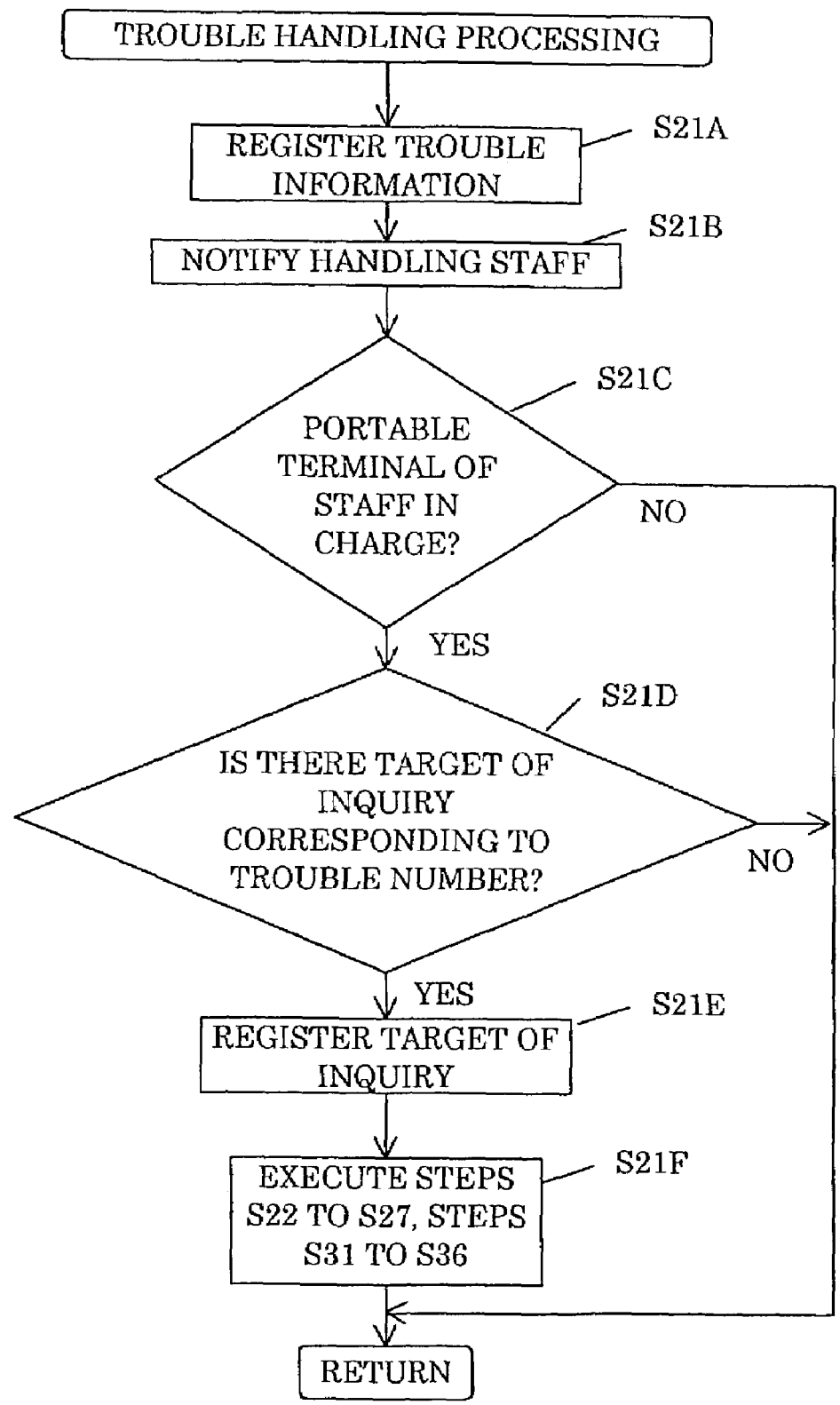
FIG. 14 is a flow chart showing a sequence of trouble handling processing.

FIG. 14 shows a sequence of the trouble handling processing. As shown in FIG. 14, the trouble information is registered in a trouble information management table of the information summation unit 422 (Step S21a). The trouble information management table is different from the trouble management table of the system controller 41, and one example of the table is shown in FIGS. 15A and 15B. FIG. 15A represents a state immediately after registration of the apparatus code of "MV-2," the machine type code of "MV" and the trouble code of "ER1025." Following this, the trouble information is sent to the notifying unit 423 from the information summation unit 422, and transmitted to the portable terminal 1 (operator) by a notification method suitable for the information (Step S21b).

For example, when the information contains speech data, the speech data are transmitted to the operator's ears through the electro-acoustic transducer 14a of the portable terminal 1. The speech information preferably contains an outline regarding the trouble. In this case, the operator can instantly learn about the outline of the received trouble information. Further, as the next action, the operator can visually access the detailed information shown on the display. Conversely, when the information contains text data or image data, the data are displayed on the display 11 of the portable terminal 1 in the form of text or image (a still image or moving image). It is preferable that the information displayed on the display 11 is used as data for conveying the details of the trouble. This realizes an advantage that the operator can visually recognize the details of the information.

Following this, based on the trouble code contained in the trouble information, the portable terminal 1 determines if it is carried by an operator in charge of handling the trouble (Step S21c). To this end, the information summation unit 422 is provided with a table of target of inquiry shown in FIG. 16 (corresponding to the information on target of inquiry 511 in the second preferred embodiment). With reference to the notification level in this table, one portable terminal belonging to the operator responsible for handling the trouble is specified.

Figure 6:
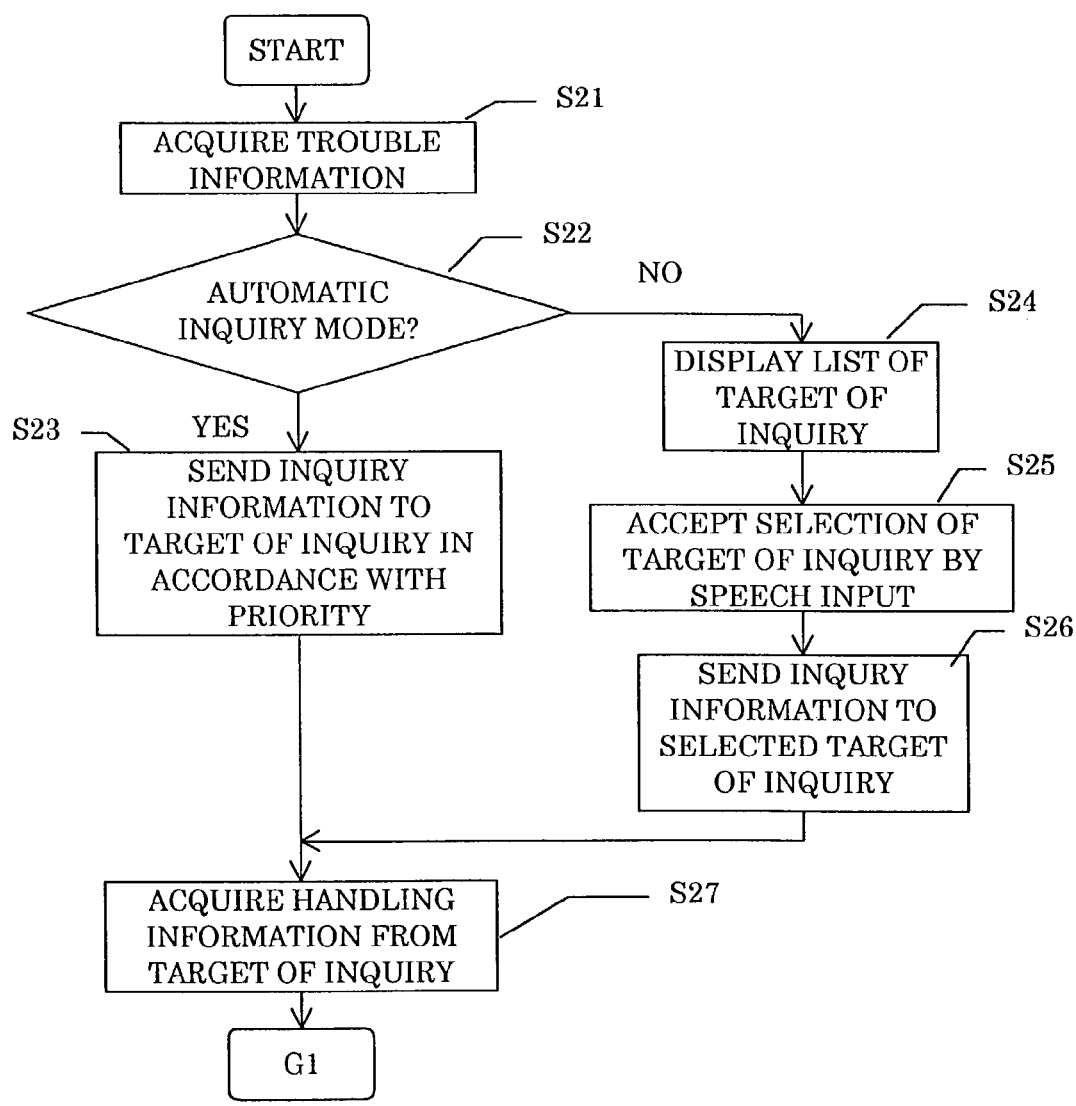
FIG. 6 is a flow chart showing another example of an operational sequence of the portable terminal.

For instance, as for the trouble code of "ER1011," the portable terminals 1 of all operators belonging to a group G1 are notified of the trouble information as shown in FIG. 6. However, of the plurality of portable terminals 1, only the one carried by the leader of the group G1 determines that the leader's terminal is the portable terminal of the operator to handle the trouble, and performs the following processing.

The portable terminal 1 of the operator in charge of handling of the trouble determines whether a target of inquiry corresponding to the trouble code exists (Step S21d). When the corresponding target of inquiry exists, as shown in FIG. 15A, an inquiry necessity flag is activated in the trouble information management table. Further, as shown in FIG. 15B, the target of inquiry corresponding to the trouble code is registered in the trouble information management table (Step S21e). In the event that no target of inquiry is registered in the table of target of inquiry, a notification is merely given to each operator in charge without performing operations described below.

Figure 7:
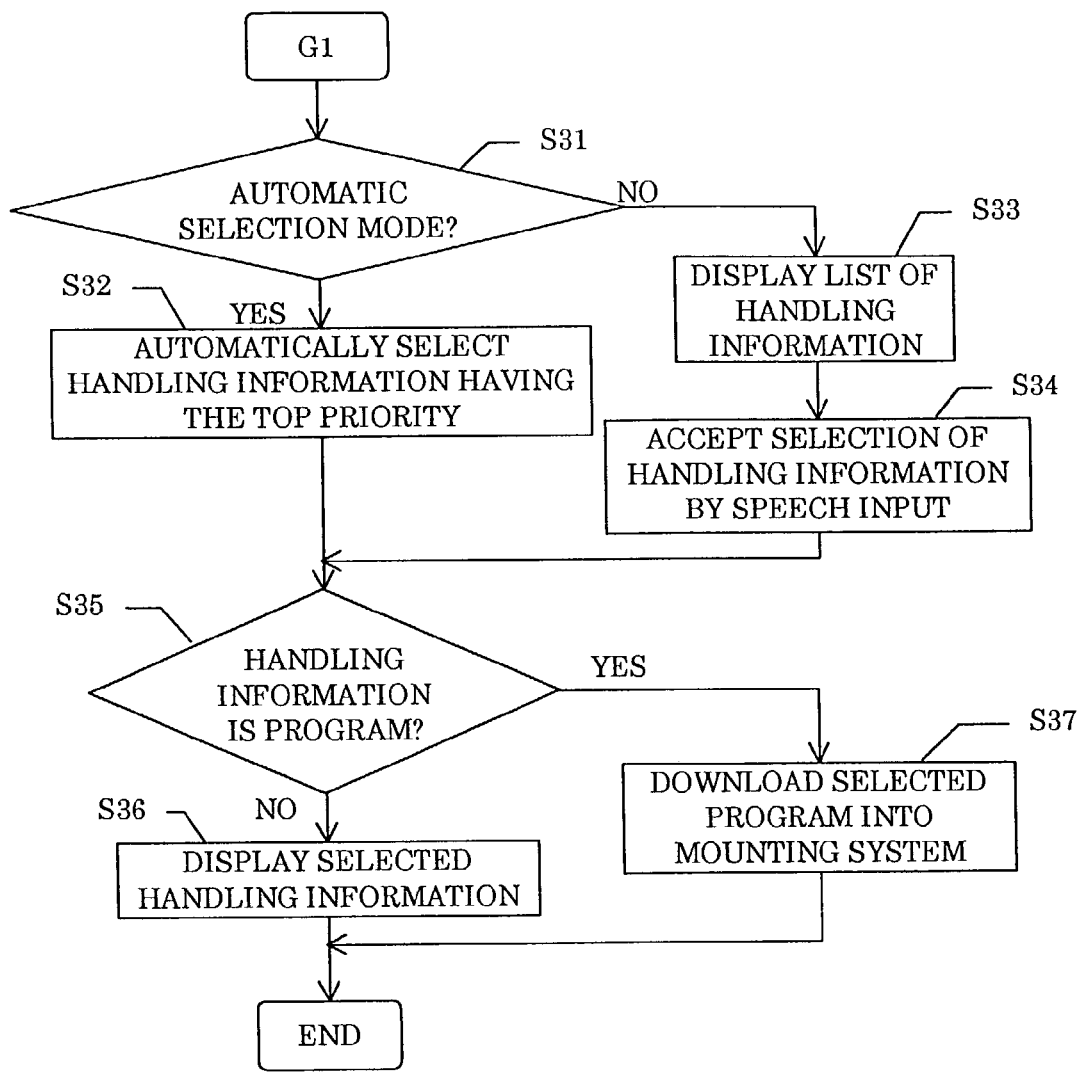
FIG. 7 is a flow chart showing another example of an operational sequence of the portable terminal.

Following this, as described earlier with reference to FIGS. 6 and 7 in relation to the second preferred embodiment, processing to receive inquiries about the trouble is performed (Step S21f). Under the automatic inquiry mode, inquiries are made in accordance with the priority listed in the table of target of inquiry shown in FIG. 16 (Step S23). Under the manual inquiry mode, inquiries are made based on selections of target of inquiry made by the operator (Steps S24 to S26). As inquiries are made, an inquiry complete flag is activated in the trouble information management table as shown in FIG. 15B. As handling information is received from the target of inquiry (Step S27), a reply complete flag is activated.

Under an automatic selection mode, the piece of handling information bearing the top priority is selected from thus acquired handling information, whereas under a manual selection mode, the operator selects handling information. The handling information is then displayed on the display 11, and output in the form of speech from the electro-acoustic transducer 14a. On the other hand, when the handling information contains a program, the program is downloaded to the apparatus where the trouble occurred (Steps S31 to S37).

Notification of Stockout

When the information summation unit 412 of the system controller 41 judges at step S102 shown in FIG. 10 that information regarding the quantity of remaining components (remaining quantity information) is input, the portable terminal 1 of a target of transmission is identified at step S105. The information summation unit 412 is provided with a table containing notification levels corresponding to the machine type codes of the apparatuses and the types of components relevant to the remaining quantity information (i.e., a table where the trouble codes shown in FIG. 13B is replaced with component codes). Therefore, the information summation unit 412 determines an operator in charge to be notified (an operator in charge of supply of components) based on the machine type code and the component code contained in the remaining quantity information (Step S105).

The information summation unit 412 thereafter sends the remaining quantity information to the transmitting unit 413. The transmitting unit 413 sends the remaining quantity information wirelessly to the identified portable terminal 1 (Step S106). The information summation unit 412 is provided with a table for indicating the history of the remaining quantity information, and the transmission complete flag is set in the table upon completion of transmission (Step S107).

Figure 17:
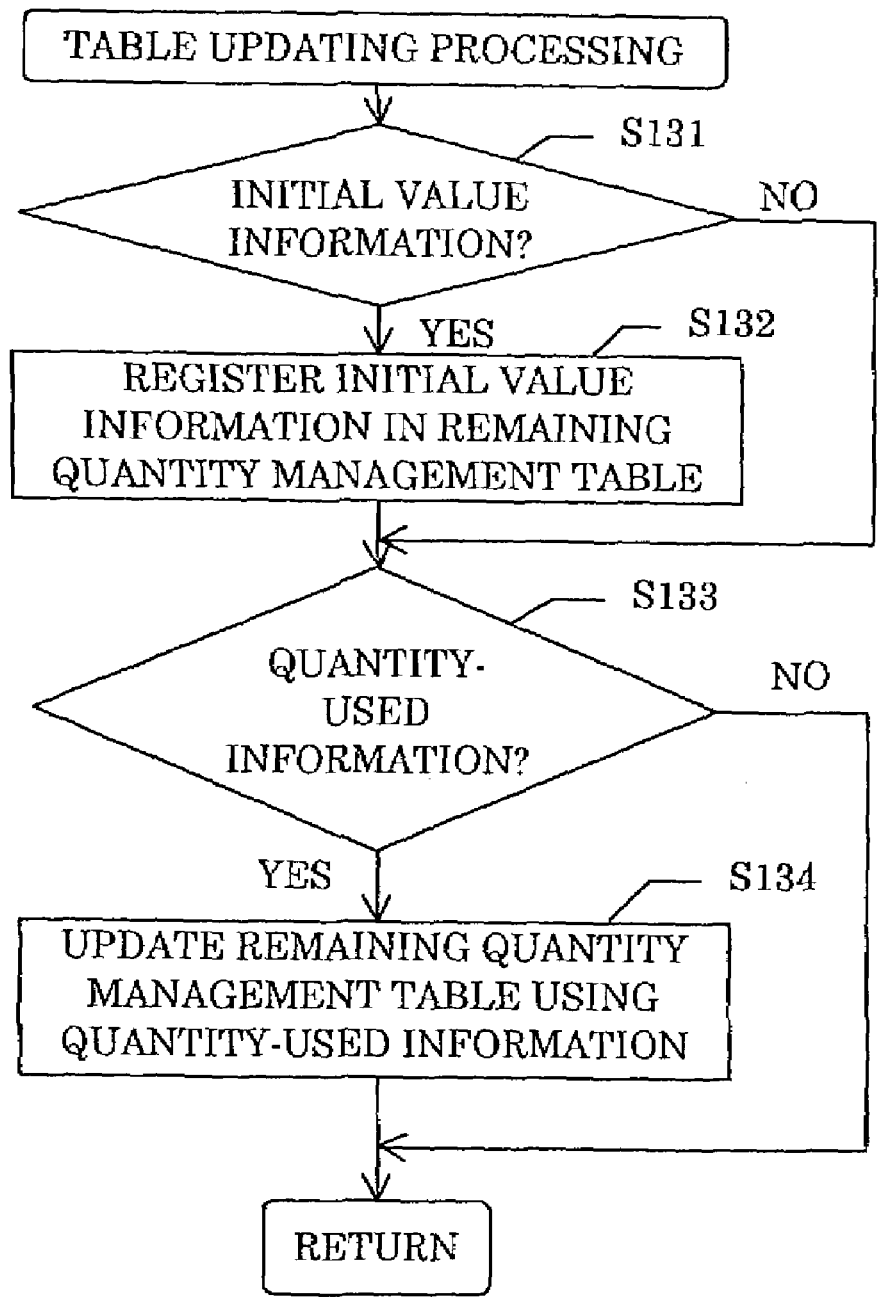
FIG. 17 is a flow chart showing a sequence of table updating processing.

The receiver unit 421 of the portable terminal 1 corresponding to the machine type code and the component code and carried by the operator receives the information from the system controller 41 (Step S111 in FIG. 11), and thus received information is sent to the information summation unit 422. Judging that the received signal represents the remaining quantity information (Step S112b), the information summation unit 422 updates the table regarding the quantity of the remaining components (Step S113b). FIG. 17 is a flow chart showing the details of table updating processing, while FIGS. 18A through 18D show examples of tables to be updated. FIGS. 18A through 18D are related to a plurality of mounting apparatuses 23. The table updating processing for the plurality of mounting apparatuses 23 is described on the assumption that the mounting system 2 includes a plurality of mounting apparatuses 23.

Remaining quantity information is either initial value information received by the portable terminals 1 upon supply of components to the mounting apparatuses 23 or quantity-used information received by the portable terminals 1 every time the mounting apparatuses 23 use a certain quantity of the components. Hence, the information summation unit 422 first determines whether the received remaining quantity information is initial value information or quantity-used information (Step S131). When the received information is initial value information, the initial value information is registered in a remaining quantity management table (Step S132). When the received information is not initial value information, the program proceeds to the step S133.

With respect to the apparatus codes and the machine type codes assigned to the mounting apparatuses 23, the remaining quantity management table contains registrations about supply position numbers representing substrate supplying positions for components fed to the mounting apparatuses 23, the component codes, the number of components mounted on one substrate, the number of supplied components in an initial stage, the number of components used up to the present moment since the initial stage, the number of currently remaining components, an estimated remaining period of time (sec) until the remaining components run out, and the time of notification (sec) when an stockout warning notification was issued. In addition, the line tact (cycle time) (sec) of the entire mounting system, calculated from production time per substrate in the mounting apparatuses 23, is also registered. In the event that buffers, as shown in FIG. 8, for temporarily storing substrates in mounting are disposed between the respective apparatuses in the mounting system, the line tact may be changed in accordance with the possible quantity of substrates to be stored in the buffers. Hence, it is possible to individually set the line tact for each one of the apparatuses 22 through 24.

FIG. 18A shows a condition where the information summation unit 422 has registered, at step S132, the initial value information in the remaining quantity management table. As shown in FIG. 18A, registered in the remaining quantity management table are component supplying position numbers corresponding to the apparatus codes and the machine type codes contained in the initial value information received before the start of the run, the component codes, the number of components mounted per substrate, and initial quantities. As for the quantities used, since the quantities are values prior to the start of the run, the quantities used are all set to zero. The "remaining quantity" is calculated by subtracting the "quantity-used" from the "initial quantity." Meanwhile, the "remaining period of time" is calculated by dividing the "remaining quantity" by the "quantity of components mounted on one substrate" and multiplying by the "line tact."

Next, the information summation unit 422 judges whether the received remaining quantity information is quantity-used information (Step S133). When judging that the received information is quantity-used information, the information summation unit 422 updates the remaining quantity management table based on the quantity-used information (Step S134), and the table updating processing is terminated. When the received information is not quantity-used information, the table updating processing is terminated without making registrations.

FIG. 18B shows an example of the quantity-used information. As shown in FIG. 18B, the quantity-used information is sent consecutively as information expressing the number of components used up to the present moment since the initial stage. Further, quantity-used information contains component supplying positions and the quantity-used associated with apparatus codes and machine type codes. The information summation unit 422 updates the quantity-used regarding the respective components in the remaining quantity management table in accordance with the quantity-used information, and using the updated quantity-used, the quantities of the remaining components and the remaining periods of time are calculated and updated in a similar manner to the above.

Figure 19:
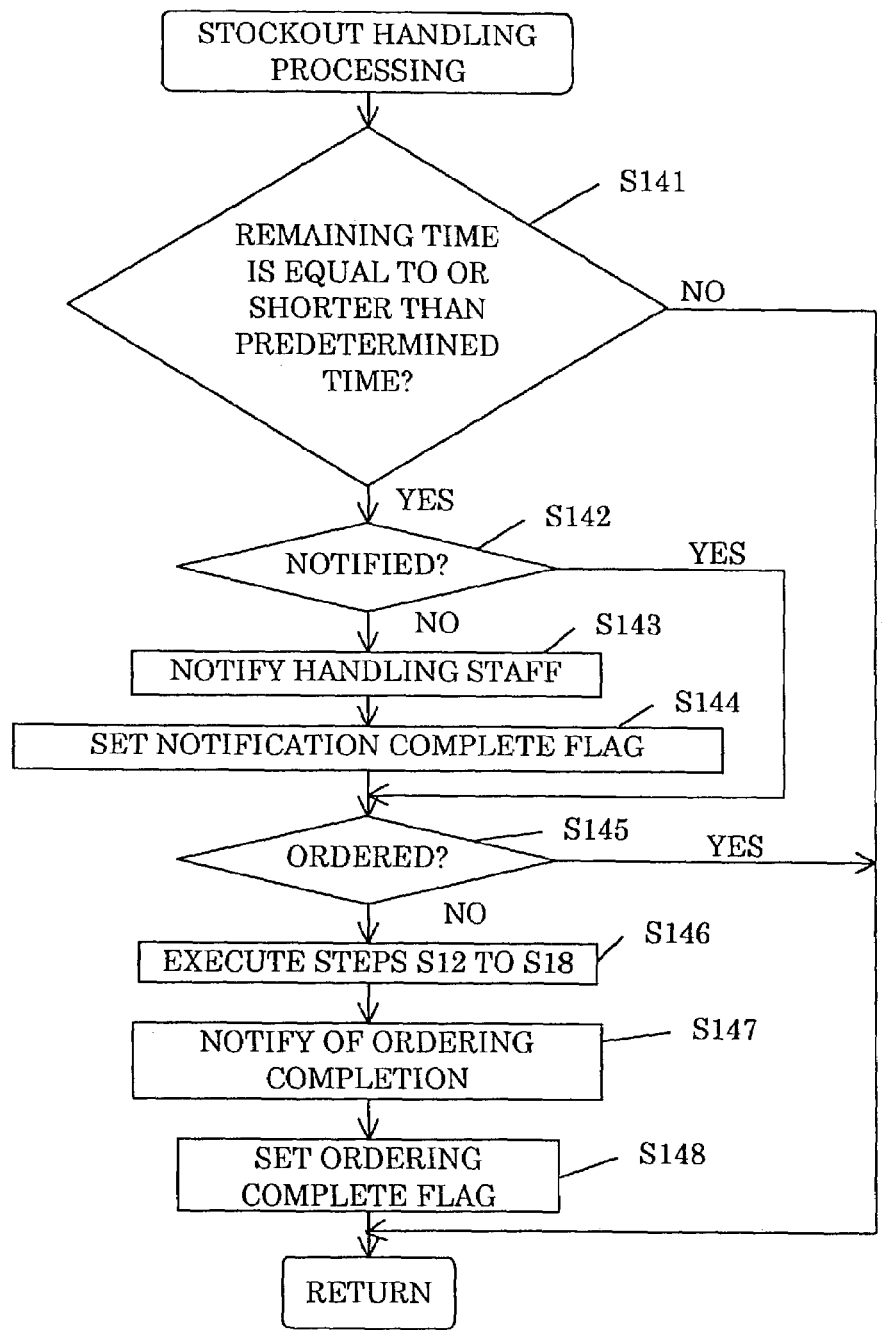
FIG. 19 is a flow chart showing a sequence of out of stock handling processing.

FIG. 19 shows a sequence of stockout handling processing executed by the information summation unit 422 (Step S114b) after the table updating processing (Step S113b in FIG. 11). During the stockout handling processing, first, whether the "remaining periods of time" in the remaining quantity management table are equal to or shorter than a predetermined period of time is judged (Step S141). The predetermined period of time corresponds to time of advance notification (warning time) for notifying of stockout before the quantity of the remaining components reaches zero. In the event that an advance notification is to be sent 20 minutes and 10 minutes before the quantity of the remaining components becomes zero, for instance, 1200 seconds and 600 seconds are set as the predetermined periods of time.

Referring to the remaining periods of time in the remaining quantity management table, in the event that there is information (component information) on components corresponding to the predetermined period of time, the information summation unit 422 proceeds to the next step S142 regarding component information. Conversely, when there is only component information beyond the predetermined periods of time, the stockout handling processing is terminated. Subsequent processing is described on the assumption that the remaining period of time has become equal to or shorter than the predetermined period of time in component information corresponding to one component. In the event that the remaining period of time becomes equal to or shorter than the predetermined period of time in component information corresponding to a plurality of components, the following processing will be executed in a sequential order or in parallel.

When it is determined that the remaining period of time is equal to or shorter than the predetermined period of time, the information summation unit 422 judges whether there has been an stockout warning notification corresponding to the predetermined period of time (Step S142). The judgment here is made based on whether the time corresponding to the predetermined period of time has been registered as the time of notification in the remaining quantity management table. Registration of the time of notification is described later. When there has been no corresponding stockout warning notification, the program proceeds to the step S143. In contrast, when a stockout warning notification has been issued, the program proceeds to the step S145.

Upon the stockout warning notification, the information summation unit 422 sends information regarding the stockout warning notification to the notifying unit 423. The information regarding the stockout warning notification contains an apparatus code relevant to the stockout warning notification, the location of stockout (such as a component reel setting position number or the like), a component code, estimated time of occurrence of stockout, the remaining period of time, the remaining quantity and other information (detailed component information, a manufacturer of the components, the shape of the components), using speech, text and an image (a still image, a moving image).

The notifying unit 423 notifies an operator carrying the portable terminal 1 (an operator in charge of supply of the components) by a notification method corresponding to the information (Step S143). When the information contains speech data, for example, the speech data are transmitted to the operator's ears through the electro-acoustic transducer 14a. With the speech data used as data for conveying the outline of the information, it is possible to instantly notify the operator of the information without fail. Further, displayed on the display 11 of the portable terminal 1, text and an image (a still image, a moving image) can be used as data on the details of the information through selection by the operator. In this case, it is possible to provide a visual notification regarding the detailed information in accordance with a request from the operator.

As the stockout warning notification is issued, the information summation unit 422 sets up, as the time of notification, the remaining period of time upon notification, for the component information relevant to the notification among that registered in the remaining quantity management table (Step S144). FIG. 18C shows one example of the remaining quantity management table where the time of notification has been set up as a notification complete flag. As for the component information corresponding to the component code of "ERJ1012" shown in FIG. 18C, the remaining period of time is updated to "1125 sec" based on the quantity-used information. As a result, the remaining period of time accordingly falls under the predetermined period of time of "1200 sec" or shorter, necessitating an stockout warning notification.

Since the stockout warning notification was issued immediately after this component information turned into a target of notification, the transmission time of "1125 sec" is set up. Therefore, even when the remaining period of time is the transmission time of "1200 sec" or shorter at the next updating step S142, with reference to the time of notification, a notification can be determined to have been already made. Accordingly, a notification will never be repeatedly issued over and over again in response to the same predetermined period of time.

As the stockout warning notification is issued, the operator normally supplies components to the apparatus having sent the information. For instance, FIG. 18D shows the remaining quantity management table as it is with 5000 pieces of components supplied in response to an stockout warning notification described with reference to FIG. 18C. Hence, in response to supply of the 5000 pieces of the components, information obtained by adding the supplied quantity (+5000) to the "initial value" regarding the components is sent from the apparatus with components fed as initial value information. The remaining quantity management table is accordingly updated at step S132. As a result of the updating, the remaining quantity and the remaining period of time are newly calculated, the time of notification is reset back to unregistered, and the components are excluded from the scope of targets of stockout warning.

In the event that no supply of components is provided to the apparatus despite of the issue of the stockout information, at the time of next advance notification (for example, when the remaining period of time becomes the predetermined period of time of 600 sec), the second stockout warning notification is provided to the operator through similar processing and the "time of notification" in the remaining quantity management table is updated.

Further, when the operator did not supply components despite the stockout warning notification and the quantity of remaining components accordingly has become zero, the apparatus with no remaining quantity sends the trouble information described above to the system controller 41 and processing is performed in accordance with the stockout handling processing described above.

In contrast, when it is determined at step S141 that the remaining period of time is equal to or shorter than the predetermined period of time, the information summation unit 422 judges whether an order for components covered by the component information has been transmitted (Step S145). The judgment here is made based on whether an ordering complete flag indicative of an issued order has been registered in the remaining quantity management table. (Registration of the "ordering complete flag" is described later.) When there has not been an order placed, the information summation unit 422 proceeds to the next step S146 and the stockout handling processing is terminated.

When there has been not an order placed, as in the first preferred embodiment, the steps S12 through S18 shown in FIG. 4 are carried out (Step S146). That is, inquiries on the inventory conditions of components are made to a plurality of external information terminals 33 of targets of inquiry, and inventory information is acquired (Steps S12, S13).

Under the automatic ordering mode, an order for components is automatically made, whereas when the mode is not the automatic ordering mode, an order for components is placed based on the manipulation of the operator (Steps S14 through S18). As ordering for components completes, the operator is notified of the completion (Step S147). For instance, the speech data is transmitted swiftly to the operator's ears through the electro-acoustic transducer 14a to notify that the order has been placed, or the operator gets notified by means of indication on the display 11.

Upon completion of the components ordering, the information summation unit 422 activates the ordering complete flag for the component information of order completion among that registered in the remaining quantity management table (Step S148). With the ordering complete flag activated, even when it is later determined at step S141 that the remaining period of time is equal to or shorter than the predetermined period of time, redundant ordering will be prevented. FIG. 18C shows one example of the remaining quantity management table where the ordering complete flag has been activated for the component information corresponding to the component code of "ERJ1012."

After an order for components is placed, delivery of the components will take place. As the operator registers the components delivery, the ordering complete flag is reset and processing regarding ordering is executed once again at the time of the next stockout warning notification as shown in FIG. 18D.

In the event that an order for components is not made automatically and the operator forgets to order components, only operations relevant to ordering will be executed again. This is because, when the portable terminal 1 receives the next remaining quantity information, the ordering complete flag would not have been activated while the time of notification has been set. This prevents failure of ordering.

Notification of Change in Product Quality

When the information summation unit 412 of the system controller 41 judges at step S102 shown in FIG. 10 that information regarding the quality of products (containing malfunction of the apparatuses, hereinafter referred to as "product quality information") has been received, the sequence proceeds to the step S105 to determine the portable terminal 1 as a target of transmission. The information summation unit 412 is provided with a table associating the notification levels in accordance with the machine type names of the apparatuses and the types of product quality information (a table where the "trouble number" in FIG. 13B is replaced with "product quality number"). Based on the machine type name and the product quality number contained in the product quality information, the information summation unit 412 determines a person in charge to be notified (i.e., an operator of the apparatus corresponding to the product quality, apparatus operations, etc.) (Step S105).

Next, the information summation unit 412 sends the product quality information to the transmitting unit 413, and the transmitting unit 413 sends the information wirelessly to the identified portable terminal 1 (Step S106). The information summation unit 412 is provided with a table indicating the history of the product quality information, and upon completion of transmission, the transmission complete flag is activated in this table (Step S107).

As the information summation unit 421 of the portable terminal 1 carried by the person in charge corresponding to the type of apparatus and the type of product quality information acquires the information from the system controller 41 (Step S111 in FIG. 11), thus acquired information is sent to the information summation unit 422. Determining that the received information is product quality information (Step S112c), the information summation unit 422 performs processing for updating the table regarding product quality management (Step S113c). FIGS. 20A through D show one example of table to be updated.

During the table updating processing, first, the product quality information received by the information summation unit 422 is registered in a product quality information management table. FIG. 20A shows one example of the product quality information management table where product quality information for each nozzle for suction of components and mounting of the components on a substrate within the mounting apparatuses 23. In FIG. 20A, the product quality information, regarding the nozzles, transmitted from the mounting apparatuses 23 contains the number of suctions representing the number of operations in each apparatus and the mounting quantity representing the quantity of components already mounted, corresponding to the apparatus name, the machine type name and the nozzle number representing the type of nozzles. The table further contains, as information regarding malfunction, information regarding the number of suction errors representing failed suctions of components with the nozzles, the number of vertical suction errors representing errors that the postures of components sucked with the nozzles become largely collapsed, and the number of recognition errors representing displacement errors recognized by a camera at the locations of components sucked with the nozzles. The information summation unit 422 calculates a suction rate (%) representing the ratio of successful suctions and a mounting rate (%) representing the ratio of successful mounting from the values of the items above contained in the product quality information, and registers the rates in the product quality information management table.

FIG. 20B shows one example of the product quality information management table registering product quality information transmitted from the inspection apparatus 25 installed in the last process in the mounting system 2. As shown in FIG. 20B, the product quality information transmitted from the inspection apparatus 25 contains the inspected quantity and the number of inspected positions respectively representing the number of inspected substrates and the number of inspected mounting positions, corresponding to the apparatus name and the machine type name of the inspection apparatus. Further, the information contains the defect quantity and the number of defective positions representing the number of inspected defective substrates and the number of inspected mounting positions where defects were found. From values of the items above contained in the product quality information, the information summation unit 422 registers, in the product quality information management table, a defective substrate rate (%) and a defective mounted position rate (%) respectively representing a rate of defects on each substrate and at each mounting position.

Figure 21:
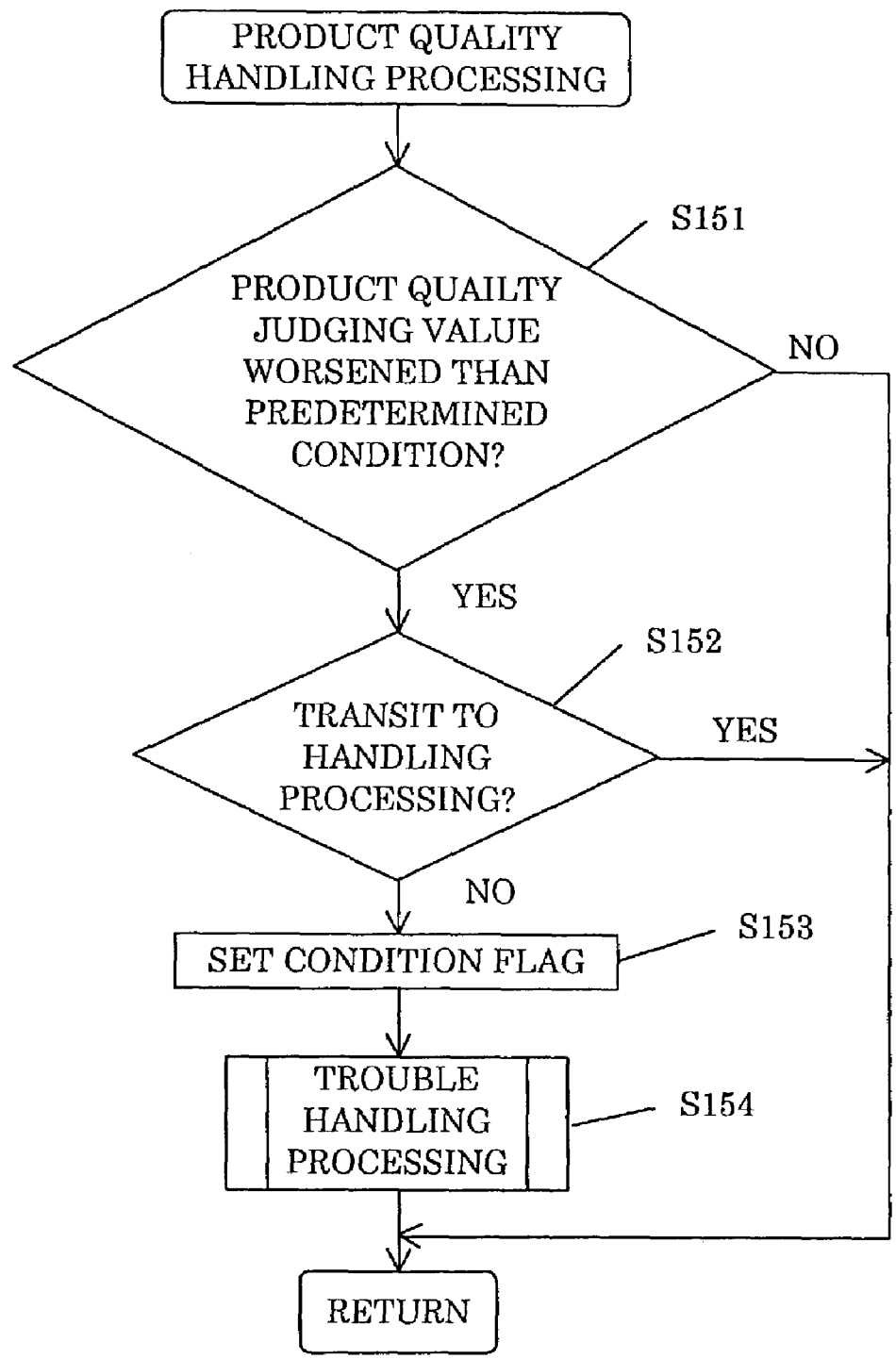
FIG. 21 is a flow chart showing a sequence of quality handling processing.

As the table updating processing completes, the information summation unit 422 then performs the product quality handling processing for a trouble related to the product quality (FIG. 11: Step S114c). FIG. 21 shows a sequence of the product quality handling processing. During the product quality handling processing, first, the information summation unit 422 determines whether values relevant to the product quality obtained from values registered in the product quality information management table (hereinafter referred to as "product quality judging value") are worse than predetermined conditions (Step S151). If worse, the processing proceeds to the next step S152, whereas the product quality handling processing is terminated if any of the product quality judging values has not become worse than the predetermined conditions. Processing at step S152 and the subsequent steps is described below as processing relevant to one product quality judging value. In the event that a plurality of product quality judging values have become worse than the predetermined conditions, the following processing is executed repeatedly or in parallel.

As for the mounting apparatus 23, for instance, the items below are set in advance as the predetermined conditions.

(A) The "number of suction errors" is a predetermined number or larger (B) The "number of mounting errors" is a predetermined number or larger (C) "Suction errors" occurring in a predetermined number of times or more in succession (D) "Mounting errors" occurring in a predetermined number of times or more in succession (E) The "suction rate" is equal to or smaller than a predetermined rate (F) The "mounting rate" is equal to or smaller than a predetermined rate In the event that the predetermined condition in (F) is set at 99.5%, for instance, since the mounting rate is 99.4% for the nozzle numbers "1" and "2" under the apparatus name of "MV-1" in the product quality information management table shown in FIG. 20A, the information summation unit 422 determines at step S151 that there is deterioration from the predetermined condition.

As for the inspection apparatus 25, the items such as those below are set in advance as the predetermined conditions.

(G) The "defect quantity" is equal to or larger than a predetermined quantity (H) The "number of defective positions" is equal to or larger than a predetermined number (I) "Defects" occurring in a predetermined number of times or more in succession (J) The "defective substrate rate" is equal to or larger than a predetermined rate (K) The "defective mounting position rate" is equal to or larger than a predetermined rate When the predetermined rate in (J) is set at 1.00%, for instance, since the defective substrate rate for the apparatus name of "IP-2" is "1.00%" in the product quality information management table shown in FIG. 20B, the information summation unit 422 determines at step S151 that there is deterioration from the predetermined condition.

The information summation unit 422 then judges whether transition to handling processing for the product quality judging value found to be worse at step S151 than the predetermined condition has already taken place or not (Step S152). The judgment here is made based on whether a condition flag has been set in the product quality information management table.

In the event that transition to the handling processing for the worsened product quality judging value has not taken place yet, the information summation unit 422 sets the numerical number assigned to the corresponding predetermined condition as a condition flag (Step S153) and proceeds to the trouble handling processing (Step S154). In the event that transition to the handling processing has already taken place, the product quality handling processing is terminated. The handling processing corresponding to the same product quality judging value will never be repeated, owing to the condition flag.

FIGS. 20C and 20D show examples of the product quality information management table where the condition flag has been set at step S153. FIG. 20C represents an example of the product quality information management table for the mounting apparatus 23. In this case, the nozzle numbers "1" and "2" under the apparatus name of "MV-1" are targets for the handling processing as described with reference to FIG. 20A and the condition flag is therefore set at step S153. Since these product quality judging values satisfy the predetermined condition (F) described above, "F" is set as the condition flag. In the event that a plurality of product quality judging values satisfy predetermined conditions, the plurality of corresponding condition flags are set for the predetermined conditions.

FIG. 20D shows an example that a condition flag is set for the apparatus name of "IP-2" in the product quality information management table for the inspection apparatus 25 as described with reference to FIG. 20B. In FIG. 20D, in order for the defective substrate rate to satisfy the predetermined condition (J), "J" is set as the condition flag at step S153 in the product quality information management table. In the event that a plurality of product quality judging values satisfy the predetermined conditions, the plurality of corresponding condition flags are set for the predetermined conditions.

The trouble handling processing after setup of the condition flag (Step S154) is similar to the trouble handling processing described earlier with reference to FIG. 14. In other words, a defect related to the product quality (or operations of the apparatus) is registered as trouble information in the trouble information management table of the information summation unit 422 (Step S21a), and the portable terminals 1 get notified (Step S21b) Only the portable terminal 1 of the person in charge of handling the apparatus specifies the external information terminal 33 of the target of inquiry, and makes an inquiry (Steps S21c to S21f).

As corresponding information is acquired from the external information terminal 33 (FIG. 6: Step S27), the handling information output, i.e., speech output, image display or a program download to the apparatus, is carried out (FIG. 7: Steps S31 to S37). After being notified of the content of the handling processing by means of speech and images, the operator, carrying the portable terminal 1 with the handling information acquired, usually takes an action for improvement of the product quality in the apparatus where the product quality judging value has worsened. As completion of the action is registered in the portable terminal 1, the condition flag in the product quality information management table is reset. For example, in the product quality information management table described in FIG. 20C, when an action such as replacement of nozzle has been taken for the nozzle numbers "1" and "2" under the apparatus "MV-1", the action is registered and thereby the condition flag "F" is reset. If the product quality judging value fails to improve despite the taken action, a notification for the handling processing and an inquiry of the external information terminal 33 are made again due to the reset of the condition flag.

As described above, the portable terminal 1 receives, from each apparatus of the mounting system 2, information regarding malfunction and information containing an inspection result indicating abnormality. Then, whether the degree of malfunction and the degree of acquisition of the inspection result indicating abnormality satisfy a predetermined condition (a transmission condition representing whether inquiry should be made to the external information terminal 33) is determined. This therefore permits predicting the occurrence of trouble before trouble actually occurs and taking countermeasures utilizing the external information terminal 33.

The portable terminal 1 may store the handling information from the external information terminal 33 to a certain degree to output the stored handling information without inquiring of the external information terminal 33, in case that the same condition flag is set once again in a short period of time.

Notification of Production Progress

When the information summation unit 412 of the system controller 41 judges at step S102 shown in FIG. 10 that information regarding production progress (hereinafter referred to as "production progress information") has been received, the sequence proceeds to the step S105 to identify the portable terminal 1 to be a target of transmission. The information summation unit 412 is provided with a table associating the notification levels in accordance with the machine type names of the apparatuses and the types of production progress information (a table where the "trouble number" in FIG. 13B is replaced with "production progress information number"). Based on the machine type name and the information type contained in the production progress information, the information summation unit 412 determines a person in charge to be notified (Step S105).

The information summation unit 412 then sends the production progress information to the transmitting unit 413, and the transmitting unit 413 sends the information wirelessly to the identified portable terminal 1 (Step S106). The information summation unit 412 is provided with a table indicating the history of the production progress information, and upon completion of transmission, the transmission complete flag is activated in this table (Step S107).

As the information receipt unit 421 of the portable terminal 1, carried by the person in charge corresponding to the type of apparatus and the type of production progress information, acquires the information from the system controller 41 (Step S111 in FIG. 11), the acquired information is sent to the information summation unit 422. Determining that the received information is production progress information (Step S112c), the information summation unit 422 performs processing for updating the table regarding production progress (Step S113d). FIGS. 22A and 22B show one example of tables to be updated.

During the table updating processing, first, the production progress information received by the information summation unit 422 is registered in a production progress information management table. FIG. 22A shows one example of the production progress information management table where production progress information has been registered. As shown in FIG. 22A, the production progress information contain the planned total quantities representing the planned substrate quantities in job-lot production, and the produced/inspected quantities representing the quantities of substrates in production or already inspected, corresponding to the apparatus names and the machine type names. The information summation unit 422 calculates the current production target substrate quantities by multiplying the values of the planned total quantities by ratios of the elapsed time to the planned production time, and registers the same as the current targeted quantities. Further, the information summation unit 422 calculates differences (namely, differences between the actually produced quantities and the planned production quantities) by subtracting the current targeted quantities from the values of the produced/inspected quantities.

Figure 23:
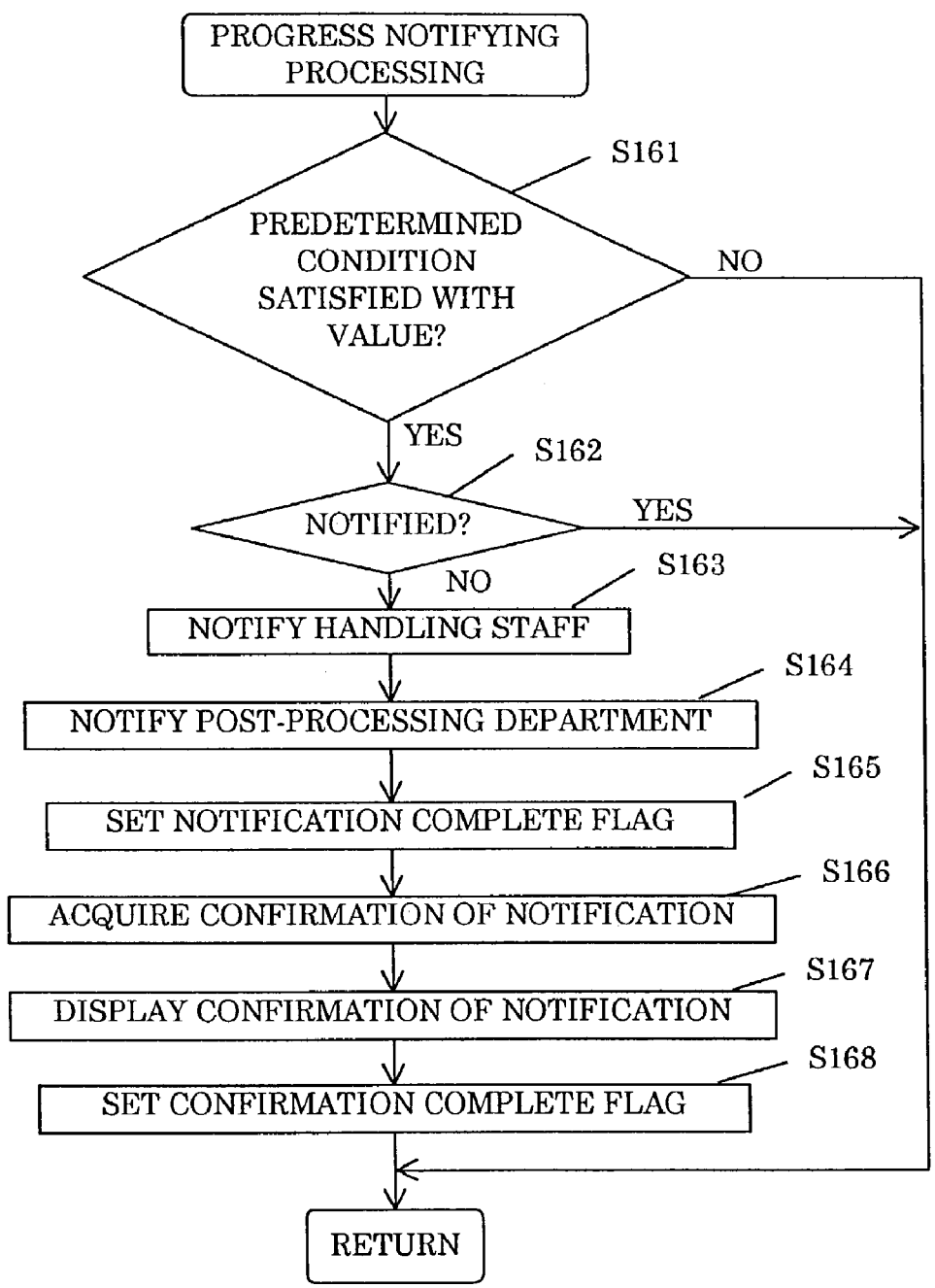
FIG. 23 is a flow chart showing a sequence of progress notifying processing.

Next, the information summation unit 422 executes progress notifying processing in accordance with a progress (Step S114d). FIG. 23 shows a sequence of the progress notifying processing. In the progress notifying processing, first, whether various values registered in the production progress information management table satisfy predetermined conditions is determined (Step S161). In the event that the predetermined conditions are satisfied, the sequence proceeds to the next step S162, whereas in the event that the predetermined conditions are not satisfied, the progress notifying processing is terminated.

As the predetermined conditions, the items such as those below, for instance, are set in advance.

(A) The "difference" exceeds a predetermined quantity of production delay (delayed production)

(B) The "planned total quantity" and the "produced/inspected quantity" are the same (completion of job-lot production)

The predetermined quantity of production delay (the condition (A)) is assumed as "100", for instance. In the production progress information management table shown in FIG. 22A, the information summation unit 422 judges that a notification is necessary at step S161 since the values of the difference are smaller than "−100" regarding all apparatuses (that is, the production delay quantity is in excess of 100). In the mounting system 2, since the apparatuses are arranged in a straight line, values of the produced/inspected quantities or the like regarding the respective apparatuses 22 through 25 are approximately the same. Hence, only a representative apparatus may be managed in the production progress information management table.

Next, the information summation unit 422 judges whether a notification corresponding to the value deemed in agreement with the predetermined condition has been issued in a neighboring time zone (Step S162). The judgment here is made based on whether the time of notification has been registered in the production progress information management table, and when there is any registration as the time of notification, whether a predetermined period of time has already elapsed since that time up to the present. The predetermined period of time is a period of time until re-transmission of the same information and may be set to "10 min," "30 min" or the like, for instance. When a notification regarding the value satisfying the predetermined condition has not been issued in the neighboring time zone, the information summation unit 422 proceeds to notifying processing at the next step S163 and subsequent steps. When a notification has been issued in the neighboring time zone, the progress notifying processing is terminated.

As for a notification, the operator is notified first (Step S163). In short, the information regarding production progress is sent from the information summation unit 422 to the notifying unit 423. Thus transmitted information is information expressing the target apparatus name or target line name, the time of occurrence of a change and the content of the occurred change (including the production quantity and a difference in number, the completed quantity in job-lot production) and optional information (including an error rate, a line operation rate and a change with time in status up to occurrence), using speech, characters, a still image and/or moving image.

The notifying unit 423 notifies the operator (production progress manager) carrying the portable terminal 1, by a notification method corresponding to the information. For instance, in the event that the information contains speech data, for example, the speech data are transmitted to the operator's ears through the electro-acoustic transducer 14a. With the speech data used as data for conveying the outline of the information, it is possible to instantly notify the operator of the information without fail. Further, characters, a still image and a moving image are displayed on the display 11 (See FIG. 2.) disposed to the portable terminal 1 to be conveyed to the operator. The data displayed on the display 11 are used as data for conveying the details about the information above, in accordance with selection made by the operator. Therefore, it is possible to visually notify the details of the information as requested from the operator.

The portable terminal 1 notifies of production progress not only to the operator, but also to staff in a post-process including a process of assembling mounted substrates into final products and a distribution process (Step S164). The post-process may be installed in a plant where the mounting system is disposed, or in another plant. A terminal for the post-process is treated as the external information terminal 33 and receives a notification from the portable terminal 1 through wireless communication, a in-house LAN and the Internet. This permits a person in charge of the post-process to appropriately adjust the operation status in the post-processing, the retention condition of work in process. Of course, a notification may be given to other departments irrelevant to the post-process. For instance, a notification may be given to a supplier of components or materials, or the external information terminal 33 installed in a department for a pre-process. Information to be notified to the external information terminals 33 is similar to information to be notified to operators.

The information summation unit 422 then sets a time when a notification is issued (the time of execution of the step S163) as the time of notification, with respect to the notified information among the production progress information registered in the production progress information management table (Step S165). FIG. 22B shows one example of the production progress information management table where the time of notification has been registered as a notification complete flag. In the example in FIG. 22B, in the production progress information management table, all pieces of the production progress information are targets of notification as described in FIG. 22A.

Receiving the information regarding production progress, the external information terminal 33 sends back information indicative of the receipt of the notification (hereinafter referred to as "confirmation of notification") to the portable terminal 1 having transmitted the information. As the portable terminal 1 receives information representing confirmation of notification (Step S166), the fact of the confirmation of notification is displayed on the display 11 (Step S167). Further, as shown in FIG. 22B, a confirmation complete flag is activated in the production progress information table (Step S168).

Upon notification of delayed production, an operator usually takes an action for improvement of the production capacity of an apparatus where production is in delay. For example, the delay in production is reduced as compared with the predetermined condition (A), when countermeasures for improving the production capacity or the like are taken against the apparatus corresponding to the production progress information regarded as a target of notification in the production progress information management table. Therefore, the production progress information is excluded from the scope of the targets of notification and the registered time of notification and the confirmation complete flag are reset.

When no countermeasures are taken despite a notification of delayed production to the operator, the production progress information remains as a target of notification at step S161. Since the confirmation complete flag is active, however, the production progress information is excluded from the scope of the targets of notification at step S162 unless the predetermined period of time has elapsed. In other words, redundant transmission of the same notification is prevented. Of course, a notification is made again as the other predetermined period of time ("30 min" after "10 min" described earlier for example) has elapsed.

In contrast, when confirmation of notification is not sent back despite the notification regarding production progress given to the external information terminal 33 from the portable terminal 1, a notification regarding production progress is issued once again after the predetermined period of time.

While the foregoing has described notifications to operators and the external information terminals 33 with respect to the predetermined condition (A) above, notifications expressing completion of job-lot production are also given to operators and the external information terminals 33 based on the predetermined condition (B). As a notification regarding completed job-lot production is given, the operator usually performs a lot change, such as switching of machine type, on the mounting system 2. In this case, the predetermined condition (B) above is released as for targets of notifications among the production progress information in the production progress information management table, and the table is updated into a new one.

Besides, an advance notification expressing completion of job-lot production may be given to operators and the external information terminals 33 based on the production progress information. This makes it possible to smoothly carry forward a job executed in the mounting system 2 or a job such as an assembling process, a distribution process and the like outside.

As described above, the portable terminal 1 according to the third preferred embodiment is capable of timely notifying an operator of an inconvenience in the apparatuses or an event of a predictable halt in the apparatuses, such as trouble in the mounting system 2, stockout of components and a deterioration in product quality or operation capabilities of the apparatuses. Further, using the external information terminals 33, it is possible to properly deal with such an event, and therefore, prevent a halt in the apparatuses, a deterioration in product quality or capabilities of the apparatuses, etc.

In addition, since a notification regarding a delay in production progress is automatically given to a person in charge and post-process, it is possible to appropriately handle a revision in production plan and an adjustment of the apparatuses.

It is also possible to notify an operator by means of automatically incoming speech via the portable terminal 1. In this case, the operator can recognize the notification without fail even if the operator cannot visually confirm the screen of the portable terminal 1 because of another job or the like.

Further, a function of sending a notification to an operator most appropriate to the handling the situation among a plurality of operators, a function of not sending the same notifications upon completion of processing and other functions allow development in application.

While the foregoing has described the preferred embodiments of the present invention, the present invention is not limited to these preferred embodiments above, but may be modified in a variety of manners.

For example, the portable terminal 1 may acquire information from individual apparatuses as in the second preferred embodiment, or from a server managing a plurality of apparatuses as in the third preferred embodiment. In addition, an apparatus within a neighboring line or neighboring plant and the portable terminal 1 may communicate with each other. An apparatus to be handled may be any apparatus requiring an operator, such as a chemical plant and power equipment, but is not limited to a production apparatus for processing, assembling, etc.

A target of inquiry to receive an inquiry from the portable terminal 1 may be one external information terminal 33, of course. In other words, there may be at least one external information terminal 33. Targets of inquiry are not limited to external information terminals 33 on the Internet 32, but may be external information terminals connected with an in-factory LAN, an in-house WAN or the like.

The information received by the portable terminal 1 from at least one apparatus, the information sent from the portable terminal 1 to the external information terminals 33 and the information received by the portable terminal 1 from the external information terminals 33 are not limited to those described in relation to the preferred embodiments above. For example, external information terminals 33 for managing production in the mounting system 2 may be disposed and information to be sent to the portable terminal 1 (e.g., the status of operation, the production quantity, the number of mounting errors, actual use of components, etc.) may be sent to the external information terminals 33. The external information terminals 33 may therefore manage production, and the status of production management may be sent back to the portable terminal 1. In this manner, the portable terminal 1 receives information regarding an apparatus to be handled, and communicates with the external information terminals 33 in relation to this information. Therefore, the information is output quickly to the operators, the apparatuses, etc.

A camera may be disposed to the portable terminal 1 so as to shoot an image, or allophone may be recorded via the microphone 13 of the portable terminal 1. Further alternatively, characters may be inputted by the speech recognition unit 122 via the microphone 13. At the stage that the portable terminal 1 creates the inquiry information 522 based on information from the apparatuses, an image shot with the camera, allophone recorded via the microphone 13, characters inputted using speech and the like may be added to the inquiry information 522.

There may be a plurality pieces of the handling information 523 selected by the portable terminal 1. For instance, the contents of a plurality pieces of the handling information 523 (may be images) may be displayed alternately or in a sequential order when output to the display 11. In the event that the handling information 523 is output in the form of speech, speech information may be output alternately or in a sequential order.

The information output to the apparatuses from the portable terminal 1 is not limited to a program, but may be an instruction signal regarding manipulations, adjustment or the like of the apparatus.

Although the preferred embodiments above require that the external information terminals 33 make a judgment upon occurrence of trouble, a simple judgment may be made by the portable terminal 1.

The portable terminal 1 according to the preferred embodiments described above is a normal portable terminal 1 with a program for managing apparatuses added and realizes voice communications between operators. However, it may be used without a voice communication function or as a dedicated portable terminal 1 for communicating only with associated external information terminals 33. The appearance does not have to be similar to that of a mobile telephone, but may be like that of a PDA.

Further, as an additional function, the portable terminal 1 may output a production plan, an instruction for manipulations of apparatuses or the like to apparatuses.

As for the type of language conversion of information, an operator may decide by manipulating the portable terminal 1 as performed in the second preferred embodiment, or alternatively, a language may be decided in advance for each operator.

While FIGS. 3 and 5 express the functions realized by the CPU 101 and the like in the form of block diagram, all or some of these functions may be disposed as a dedicated electric circuit. In addition, divisions of these functions may be appropriately changed.

In the third preferred embodiment, the portable terminals 1 are provided with the tables registering a variety of information, such as troubles, stockout of components, the statuses of operations in the apparatuses, the quality of products and production progress within the mounting system 2. Thereby, the portable terminals 1 make a decision as for notifications to operators or inquiries to the associated external information terminals 33. Alternatively, judgments regarding updating of the tables, notifications and the like may be appropriately divided between the system controller 41 and the portable terminals 1.

As described above, according to the present invention, it is possible to quickly output information from external information terminals to operators, relevant apparatuses and the like based on information from the relevant apparatuses. This allows quick countermeasures to be taken in accordance with the conditions of the apparatuses.

D. Fourth Preferred Embodiment

Figure 24:
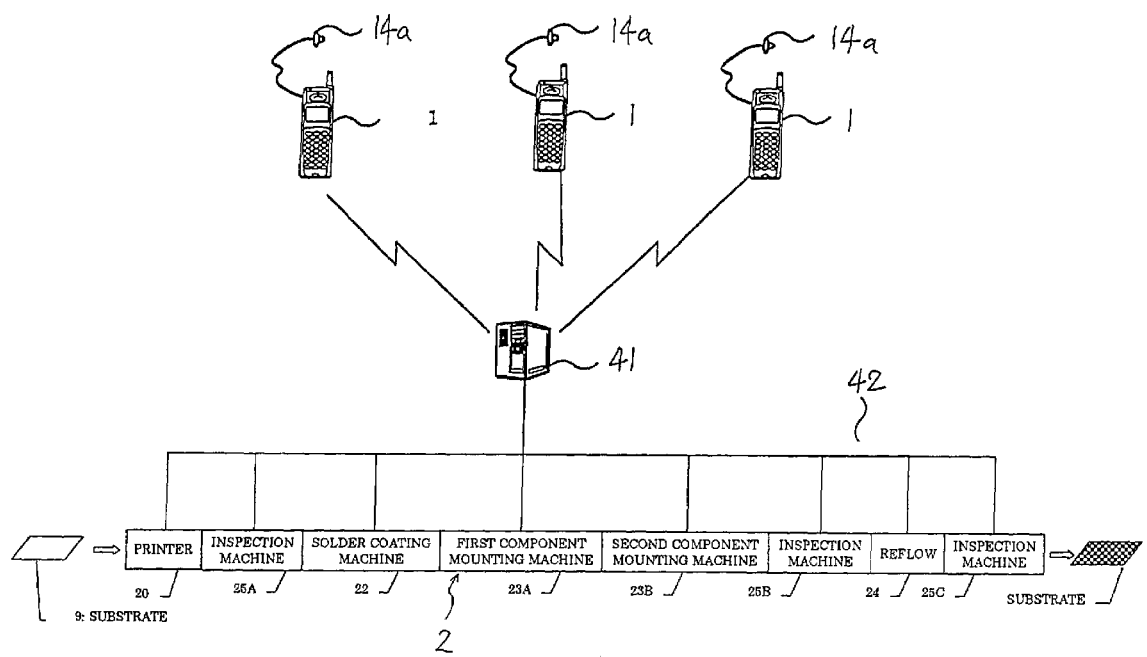
FIG. 24 shows a structure of a message notifying system according to a fourth preferred embodiment.

FIG. 24 shows a preferred embodiment wherein the message notifying system according to the present invention is applied to a component mounting system for mounting a plurality of electronic components on a substrate.

The mounting system 2 comprises a plurality of manufacturing apparatuses. These manufacturing apparatuses include a printer 20 for printing electric circuits on the substrate 9, the coating machine 22 for coating the substrate 9 now bearing printed electric circuits with solder, first and second mounting machines 23a and 23b for mounting electronic components on the substrate 9, and the reflow apparatus 24 for heating the solder and accordingly fixing mounted components to the substrate 9. This plurality of apparatuses are well-known apparatuses in the field of component mounting, and therefore, will not be described in detail. The mounting system 2 further comprises three inspection apparatuses 25a, 25b and 25c, and these inspection apparatuses are disposed between the printer 20 and the coating machine 22, between the second mounting machine 23b and the reflow apparatus 24 and on the downstream side to the reflow apparatus 24.

As shown in FIG. 24, the message notifying system comprises the system controller 41 or a host computer, and a plurality of portable terminals 1 capable of communicating with the system controller 41. The system controller 41 is connected with the respective apparatuses under the mounting system 2 on the network 42 so as to communicate with the respective apparatuses. Communications between the system controller 41 and the respective apparatuses may be of a cable communication method, a wireless communication method or any combination of these. While it is preferable that communications between the system controller 41 and the portable terminals 1 are of a wireless communication method, a cable communication method may be used. In the fourth preferred embodiment, still image data, moving image data and/or speech data are sent from the system controller 41 to the portable terminals 1. Hence, the portable terminals 1 comprise small-size liquid crystal displays to display still images and/or moving images based on image data and an acoustic transducer (speaker). For instance, mobile telephones (e.g., PHS mobile telephones) or PDAs may be used as the portable terminals 1. It is preferable to use, as the portable terminals 1, an apparatus equipped with a function of automatically receiving a signal sent from the system controller 41 without any action made by an operator (such an action as the operator pressing a receive key on the portable terminal 1). In this case, for the operators to recognize received messages without fail, the portable terminals 1 preferably comprise earphone-type electro-acoustic transducers.

Figure 25:
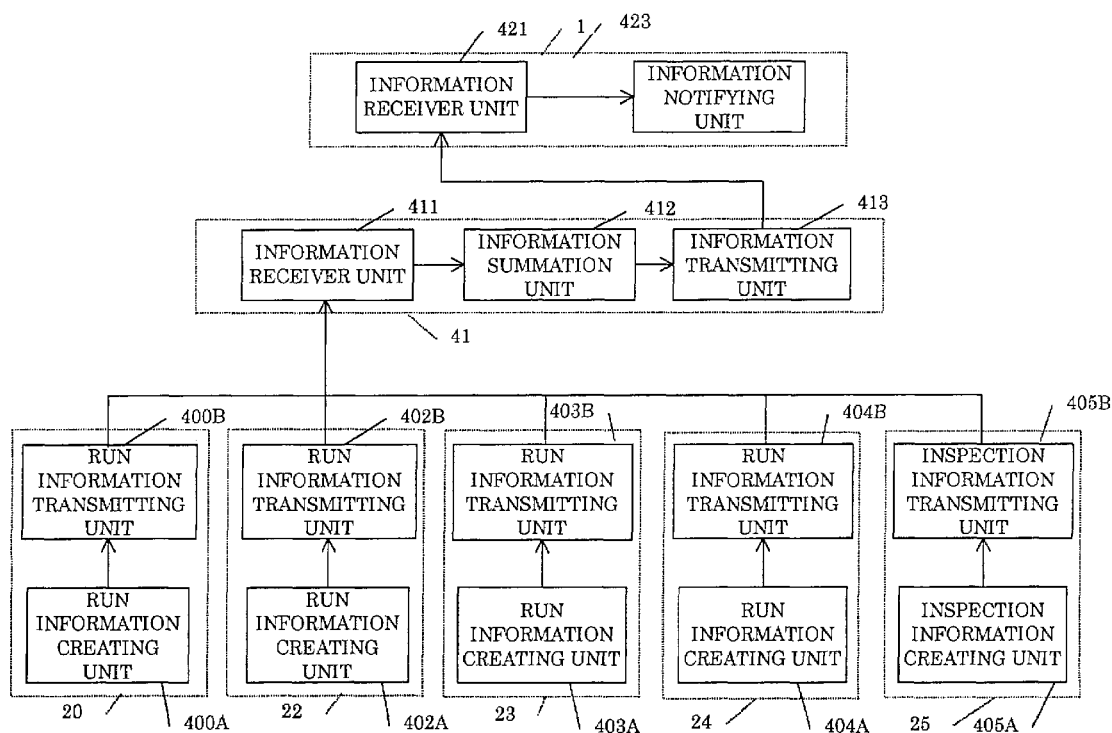
FIG. 25 is a block diagram showing a flow of information sent and received in the system shown in FIG. 24.

Referring to FIG. 25, a flow of a signal between the message notifying system and the mounting system 2 and an associated communication system is described. As shown in FIG. 25, the respective apparatuses under the mounting system 2 comprise information creating units 400a and 402a through 404a for creating data representing the statuses of the respective apparatuses, and information transmitting units 400b and 402b through 404b for outputting the data created in the information creating units 400a and 402a through 404a. In a similar manner, each inspection apparatus 25 also comprises the information creating unit 405a and the information transmitting unit 405b. The system controller 41 comprises the receiver unit (inputting unit) 411 for receiving a signal sent from the apparatus 20 via the network 42, the information summation unit 412 for processing the signal received by the receiver unit 411 and for creating an output signal, and the transmitting unit (outputting unit) 413 for outputting the signal created in the information summation unit 412. Each portable terminal 1 comprises the receiver unit (inputting unit) 421 for receiving a signal output from the transmitting unit 413 of the system controller 41, and the notifying unit (the display and the acoustic transducer described above) 423 for outputting, in the form of speech and/or image, a message corresponding to the signal received by the receiver unit 421.

Figure 26:
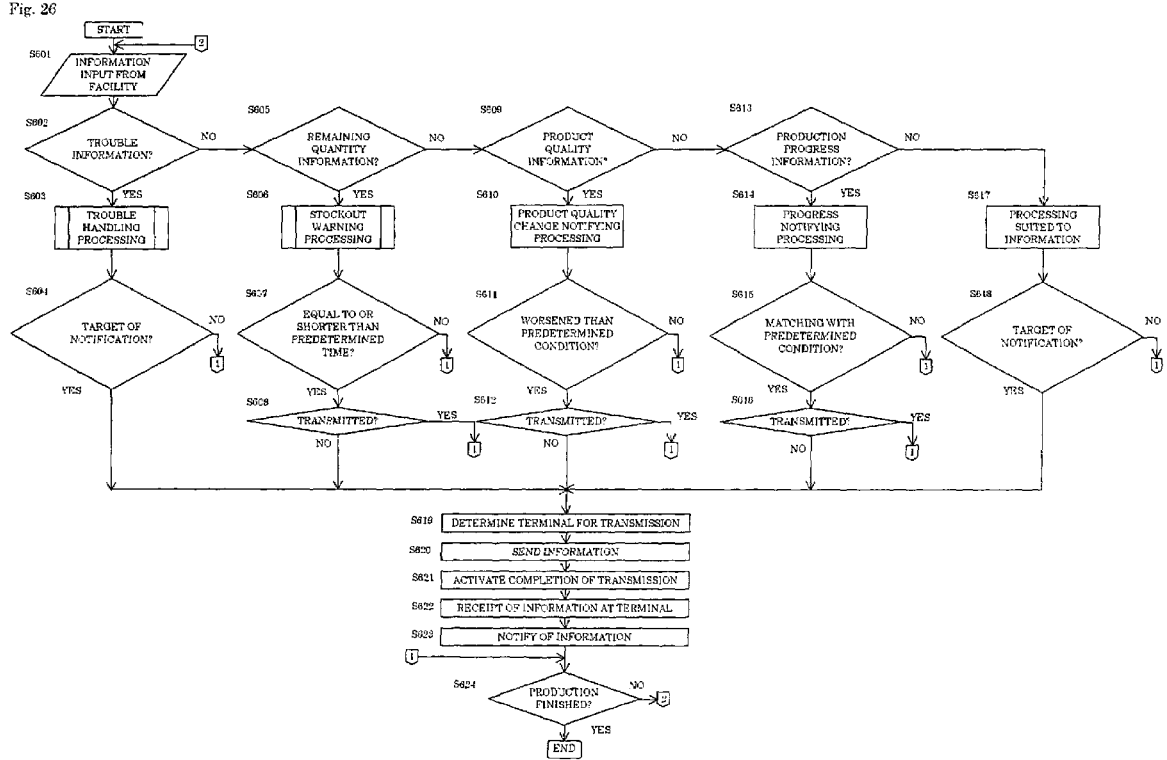
FIG. 26 is a flow chart of operations executed by a system controller and a communication terminal of the system shown in FIG. 24.

Signal processing by the communication system shown in FIG. 25 is now described with reference to a program flow in FIG. 26. In this program, at step 1, status signals output from the apparatuses 20, 22 through 24 or the inspection apparatus 25 in the mounting system 2 are sent to the receiver unit 411 of the system controller 41 via the network 42. Based on the program stored in the system controller 41, the information summation unit 412 judges which signal the status signal received at the receiver unit 411 is among that related to operations of the apparatuses (e.g., failures, troubles, etc.) (Step S602), that related to the quality (performances) of the apparatuses (Step S609) or that related to production progress (productivity) by the apparatuses (Step S613).

Notification of Trouble

Figure 27:
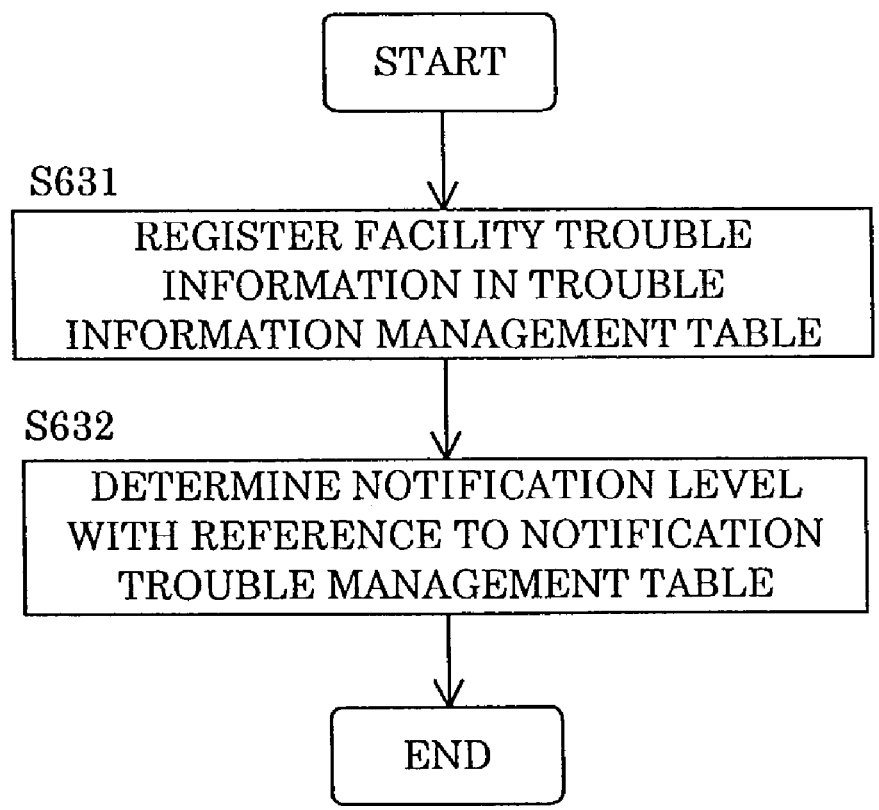
FIG. 27 is a flow chart showing a sub routine in trouble notifying processing executed at Step S603 shown in FIG. 26.

When it is determined that the status signal is an operation signal, at step S603, the information summation unit 412 performs processing for warning of trouble shown in FIGS. 27 and 28. To be more specific, at step S631, the information summation unit 412 acquires information related to trouble (trouble information) from the operation signals, and registers this information in a management table shown in FIG. 28A. At step S632, a target of transmission is determined.

Items to be registered in the trouble management table include the apparatus names given to the respective apparatuses, the machine type names given to the respective processes, the time of occurrence of trouble, a trouble number representing the content of the trouble, the place where the trouble occurred, targets to which the system controller 41 sends a signal, and a flag denoting whether the signal has been sent to the targets of transmission.

Information regarding the apparatus names, the machine type names, the time of occurrence, the trouble number and the location of occurrence is contained in signals to be fed to the information summation unit 412. As for targets of transmission not identified in cells in the management table shown in FIG. 28A, the information summation unit 412 determines the appropriate targets of transmission from the machine type names and the trouble numbers based on a management table shown in FIG. 28B. This management table shows the relationships among the machine type names, the trouble numbers and targets of transmission. Based on the table, targets of transmission are determined from the machine type names and the trouble numbers. Targets of transmission are divided into "UNNECESSARY", "ALL", "OPERATOR IN CHARGE" and "GROUP IN CHARGE." "UNNECESSARY" means that "no message to be transmitted"; "ALL", "a message needs to be transmitted to all operators (portable terminals)"; "OPERATOR IN CHARGE", "a message needs to be transmitted to an operator in charge (portable terminal)"; and "GROUP IN CHARGE", "a message needs to be transmitted to all operators (portable terminals) in a group in charge."

A relationship between a group to be targets of transmission and operators/portable terminals belonging to the group is contained in a management table (shown in FIG. 28C) stored in the information summation unit 412. As a particular group is identified from the management table shown in FIG. 28B, operators or portable terminals in this particular group get specified. Thus, the specified operators or portable terminals are then entered in the cells for targets of transmission in the management table A. As shown in FIG. 28C, the management table contains items for jobs, the apparatus names, the names of operators in charge and group numbers. Particular jobs (e.g., manipulations of the apparatuses, replenishment of components, maintenance and inspection, etc.) are assigned to operators as illustrated. Meanwhile, the groups are aggregations of the plurality of operators in charge of a specific job, but not determined depending on the apparatuses to handle. Further, one operator is associated with one portable terminal in some cases (that is, one operator always carries a particular portable terminal), and in other cases, a plurality of operators working in shifts carry one portable terminal in turn. In the latter case, operator codes may be registered in the management table at the start of the shift. The relationships between the groups and the operators in the groups may be updated, if necessary.

In the cells for the transmission complete flag in the management table A, the transmission complete flag representing that a message has been transmitted is entered after transmission of a message to a particular target of transmission based on processing described later. For reference, FIG. 28D shows the management table 54 where targets of transmission and the transmission complete flags have been entered.

As the processing at step S603 completes in the manner described above, the information summation unit 412 confirms targets of transmission at step S604. When it is determined that there is a target of transmission, the information summation unit 412 proceeds to a step S619. When it is determined that there is no target of transmission, the information summation unit 412 jumps to a step S624.

At step S619, the information summation unit 412 determines a target of transmission (an operator or portable terminal). Next, at step S620, the information summation unit 412 provides the transmitting unit 413 with a signal containing a message to be sent out to the portable terminal 1. This signal is output from the transmitting unit 413. Upon signal output from the transmitting unit 413, the information summation unit 412 adds the transmission complete flag to the corresponding trouble information at step S621 and registers that the trouble message has been sent to the operator responsible for solving the trouble as shown in FIG. 28D.

Next, at step S622, the signal output from the notifying unit 423 is received by the operator or the receiver unit 421 of the portable terminal 1 designated by this signal. At this stage, the receipt by the portable terminal 1 takes place automatically without any receiving action by the operator such as pressing of a predetermined key. Information acquired by the portable terminal 1 contains the name of the apparatus where the trouble occurred, the trouble number, the time of occurrence and others (including the cause of the trouble, the relationships with other apparatuses and the condition of the trouble). Following this, at step S623, the information received by the receiver unit 421 is sent to the notifying unit 423, and displayed on the display of the portable terminal 1 in the form of text or image (a still image or a moving image). When this information contains speech information, the information is transmitted in the form of speech to the operator's ears through the acoustic transducer.

The speech information preferably contains an outline regarding the trouble. In this case, the operator can instantly learn about the outline of the received trouble information. Further, as a next action, the operator can visually access the detailed information shown on the display.

At last, the information summation unit 412 determines at step S624 whether the processing in the mounting system is complete. If it is determined that the mounting processing has completed, the information summation unit 412 terminates the program. On the other hand, if the mounting system is still working, the information summation unit 412 returns to the step S601.

Notification of Stockout

Figure 29:
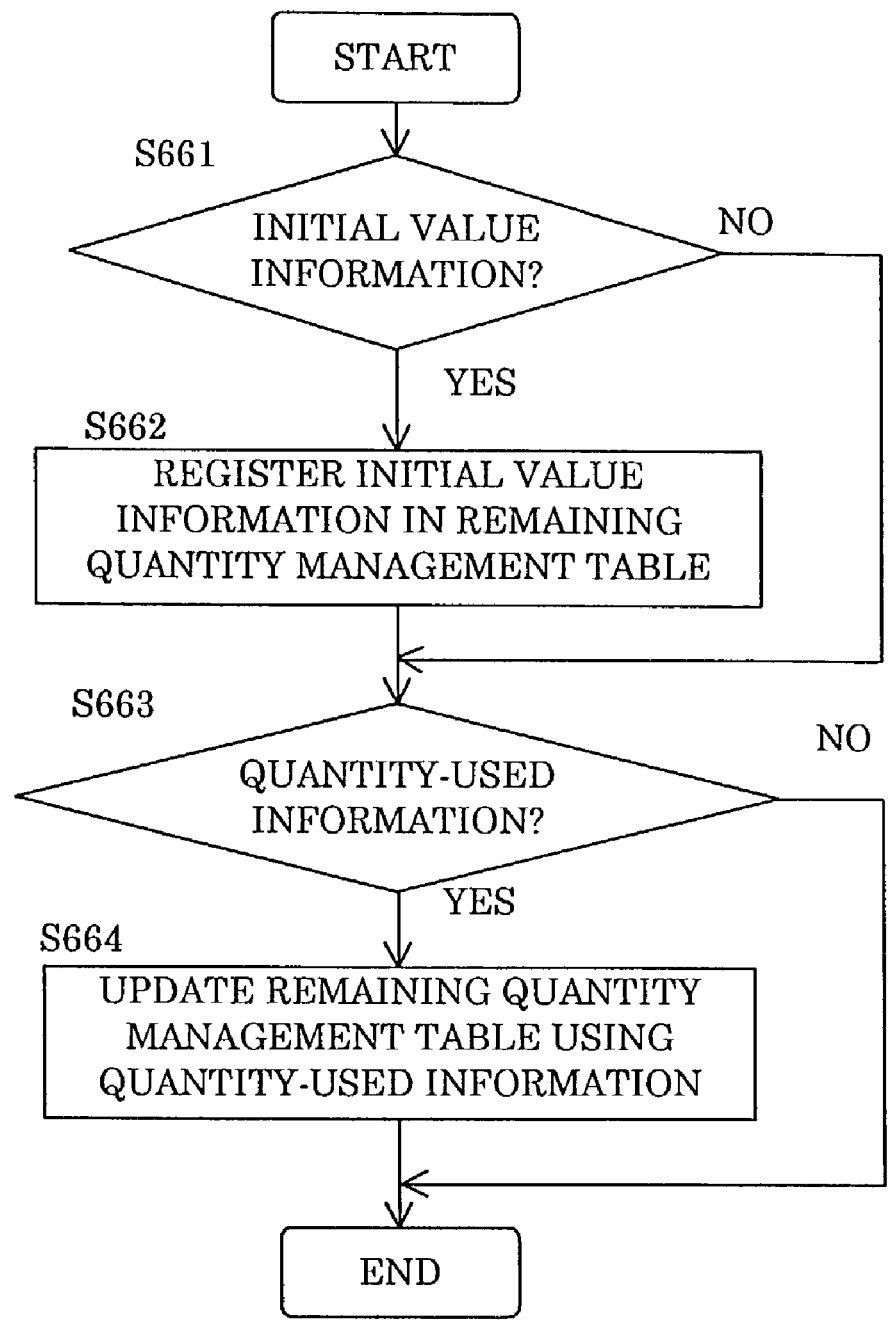
FIG. 29 is a flow chart of processing of a sub routine in stockout warning processing executed at Step S606 shown in FIG. 26.

When it is determined at step S605 that the status signal is remaining quantity information or stockout information, the information summation unit 412 performs stockout warning processing at step S606. More specifically described with reference to FIG. 29, at step 6, the information summation unit 412 determines whether the information received at step S661 contains an initial quantity of components supplied to an apparatus relevant to the received information. When the received information is the initial quantity, at step S622, the information summation unit 412 registers the initial quantity in a component management table. Next, at step S663, the information summation unit 412 determines whether the received information contains a quantity of components used in the apparatus relevant to the received information. When the received information contains the quantity-used, at step S664, the information summation unit 412 registers the remaining quantity in the component management table as shown in FIG. 30C. FIG. 30B shows one example of information containing the quantity of components used. As shown in FIG. 30B, this information contains a supply position number representing the locations of ports in an apparatus where components are supplied, and the quantity of components used in the apparatus, in addition to the apparatus and the machine type names.

As shown in FIG. 30A, items registered in the component management table include, in addition to the apparatus and the machine type names, the line tact of the entire mounting system, calculated from production time per substrate, position numbers representing the locations of component supply ports, the component type of supplied components, a number of components per substrate, the initial quantity of components described above, the quantity of components used, the quantity of remaining components, an estimated period of time (remaining period of time) until the remaining components run out, and the time of transmission of an stockout warning. In the event that buffers for temporarily storing substrates in mounting are disposed between the respective apparatuses in the mounting system shown in FIG. 24, the line tact may be changed in accordance with the possible quantity of substrates to be stored in the buffers. Hence, the line tact may be set by apparatus.

The component management table shown in FIG. 30A represents the state before the start of mounting. Hence, the quantity-used is set to zero. As FIGS. 30A through 30C clearly show, the "remaining quantity" can be obtained by subtracting the "quantity-used" from the "initial quantity." Meanwhile, the "remaining period of time" is obtained by dividing the "remaining quantity" by the "number of components mounted per substrate" and multiplying by the "line tact."

Referring back to FIG. 26, at step S607, the information summation unit 412 determines whether the remaining period of time is shorter than a predetermined period of time. The predetermined period of time corresponds to the time of advance notification of stockout before the remaining components run out. In the event that an advance notification is to be sent 20 minutes and 10 minutes before the remaining components run out, 1200 seconds and 600 seconds are set as the predetermined period of time.

When it is determined that the remaining period of time is not shorter than the predetermined period of time, the program jumps to the step S624. Conversely, when it is determined that the remaining period of time is shorter than the predetermined period of time, the program proceeds to the step S608 to determine whether an advance notification has been transmitted. The judgment regarding whether an advance notification has been transmitted is made by confirming that the time of completion of transmission has been registered in the component management table. The time of completion of transmission corresponds to the time of advance notification, and is registered in the component management table upon transmission of an advance notification at step 21 described later.

When it is determined at step S608 that an advance notification has not been transmitted, at step S619, the information summation unit 412 determines an operator (portable terminal) in charge of the apparatus where a stockout trouble occurred or a group including the operator, based on the component management tables shown in FIG. 28. Next, at step S620, the information summation unit 412 sends to the transmitting unit 413 a signal containing a message to be transmitted to the portable terminal 1. This signal is output from the transmitting unit 413. The signal output from the transmitting unit 413 contains the apparatus name relevant to the stockout warning, the supply position number relevant to stockout, the model number of the component, the estimated time of occurrence of stockout, the remaining period of time, the quantity of remaining components and others (including detailed information regarding the components, a manufacturer of the components, the shape of the components and the quantity of in-stock components).

As the signal is output from the transmitting unit 413, as shown in FIG. 30C, at step S621, the information summation unit 412 adds the time of transmission (e.g., 1125 sec) to the component management table and records that an advance notification regarding stockout has been transmitted to the operator responsible for solving the trouble. Hence, during subsequent processing (Step S608), it is judged that an advance notification regarding stockout has been transmitted regarding the corresponding components. This prevents repeated transmission of an advance notification in response to the time of advance notification of 1200 seconds.

Next, at step S622, the information regarding stockout output from the transmitting unit 413 is received by the operator or the receiver unit 421 of the portable terminal 1 designated by this information. At this stage, the receipt by the portable terminal 1 automatically takes place without any receiving action by the operator such as pressing of a predetermined key. The information received by the receiver unit 421 is then sent to the notifying unit 423 at step S623, and the detailed information is displayed on the display of the portable terminal 1 in the form of text or image (a still image or a moving image) as in the case of trouble warning described above. Meanwhile, outline information is transmitted in the form of speech to the operator's ears through the acoustic transducer.

At last, the information summation unit 412 determines at step S624 whether the processing in the mounting system is complete. If it is determined that the mounting processing has completed, the information summation unit 412 terminates the program. On the other hand, if the mounting system is still running, the information summation unit 412 returns to the step S601.

Receiving the stockout information through the portable terminal 1, the operator supplies components to the corresponding apparatus. As a result, the component management table is updated. For instance, as shown in FIGS. 30C and 30D, in the event that 5000 pieces of the component (No. ERJ1012) have been replenished responding a transmitted advance notification of its stockout, the initial quantity of the corresponding component is changed to 7550 from 2550. The quantity-used, the remaining quantity and the remaining period of time are calculated using the updated initial quantity. In addition, as a next stockout will be judged based on the updated remaining period of time or the updated remaining quantity, the time of transmission of "1125 sec" registered in the pre-updating table shown in FIG. 30C is deleted from the updated table shown in FIG. 30D.

Conversely, in the event that there has been no replenishment of components to the apparatus relevant to the stockout information output, the second advance notification is transmitted at the time of the next advance notification (e.g., in 600 sec). In consequence, the "time of transmission" in the component management table is updated to "600 sec."

In the event that no component is replenished despite transmission of the second advance notification and the remaining components consequently run out, a warning is given to the operator based on the trouble warning described earlier.

Notification of Product Quality

When it is determined at step S609 that the status signal is product quality information regarding the apparatuses, the information summation unit 412 performs product quality notifying processing at step S610. In this processing, the information summation unit 412 registers received product quality information in a product quality table 81. FIG. 31A shows one example of the product quality table created with respect to component suction nozzles of the mounting apparatus. As shown in FIG. 31A, the product quality table contains the apparatus names of component mounting machines, the machine type names and the numbers assigned to the nozzles disposed to the component mounting machines. The product quality table further contains, with respect to each nozzle number, information regarding the quantity of components sucked with the nozzles, the quantity of components mounted with the nozzles, the number of errors representing failed suction of components with the nozzles, the number of suction errors attributed to disagreement between the nozzles and components to be sucked with the nozzles, and numbers of suction errors recognized from images obtained by shooting the nozzles and components sucked with the nozzles. In addition, the product quality table contains information regarding a suction rate (%) (rate of successful suctions) calculated from the information and a mounting rate (%) (rate of successful mounting).

The information summation unit 412 comprises a different product quality table 82 shown in FIG. 31B. Information sent from the inspection apparatus disposed for the last process of the mounting system is registered in the product quality table 82. As shown in FIG. 31B, the product quality table 82 contains, in addition to the apparatus name of the inspection apparatus and the machine type name, information regarding the number of inspected places, the quantity E4 of substrate determined defective, the number of mounted positions determined defective, a defective substrate rate (%) calculated from the quantity of defective substrates and a defective mounted position rate (%) calculated from the number of mounted positions.

Next, at a step S611, the information summation unit 412 determines whether each data registered in the product quality tables 81 and 82 is below an associated predetermined value set for each data. When it is determined that the registered data is below the predetermined values, the program decides that the product quality in the apparatus has dropped, and proceeds to a step S612. In the opposite case, the program proceeds to the step S624.

For instance, in the case of the mounting apparatuses, the predetermined values are set by item related to suction errors and for the suction rate and the mounting rate. As for suction errors, the number of suction errors occurring in succession is set as a predetermined value.

Hence, assuming the predetermined value of the mounting rate as 99.5%, in FIG. 31A, deterioration in mounting quality is determined for the two nozzles specified with the apparatus name of MV-1, the machine type name of MV and the nozzle numbers of 1 and 2 due to their mounting rates of 99.4% each.

In a similar manner, in the case of the inspection apparatus, for example, the predetermined values are set with respect to each one of the quantity of defective substrates, the number of mounted positions determined defective, the defective substrate rate and the defective mounted position rate. Further, the number of successive appearances of substrates defective or including defective mounting is set as a predetermined value.

Therefore, when the predetermined value of the defective substrate rate is set to 1.0%, in FIG. 31B, since the registered defective substrate rate as for inspection apparatus specified with the apparatus name of IP-2 and the machine type name of IPJ is 1.0%, it is determined that the product quality in a mounting apparatus for mounting components inspected by the inspection apparatus has dropped.

Next, at step S612, the information summation unit 412 judges whether a warning indicative of the deteriorated product quality has been already sent to the portable terminal 1. The judgment here is made based on whether the transmission complete flag has been registered for the corresponding information as shown in FIG. 31C. Registration of the transmission complete flag is described later. In the event that the transmission complete flag has not been registered, the program proceeds to the step S619. In other cases, the program proceeds to the step S624.

At step S619, the information summation unit 412 determines an operator (portable terminal) in charge of the apparatus in with the trouble regarding the poor product quality or a group including this operator, based on the management tables shown in FIGS. 28A to 28D. Next, at step S620, the information summation unit 412 sends to the transmitting unit 413 a signal containing a message to be transmitted to the portable terminal 1. This signal is output from the transmitting unit 413. The signal output from the transmitting unit 413 contains the apparatus name relevant to the warning regarding the poor product quality, the places with the poor product quality (e.g., the component supplying position, the position on substrates where components are mounted), the model number of the components, the time of occurrence, the content (e.g., the trouble number) and others (including detailed information, images of the error and a change with time in product quality until the warning).

Upon outputting of a product quality warning based on the output signal from the mounting apparatus, as shown in FIG. 31C, at step S621, the information summation unit 412 registers the transmission complete flag in the product quality management table. As described above, in the event that there is a deterioration in quality of mounting rate, the transmission complete flag F containing a code indicative of this mounting rate is registered. In response to transmission of a plurality of warnings, the transmission complete flags corresponding to the respective warnings are registered.

At the same time, in response to outputting of a product quality warning based on the output signal from the inspection apparatus, as shown in FIG. 31D, at step S621, the information summation unit 412 registers the transmission complete flag in the product quality management table. As described above, in the event of deterioration in quality relevant to the defective substrate rate S3, the transmission complete flag J containing a code indicative of this defective substrate rate is registered. In response to transmission of a plurality of warnings, the transmission complete flags corresponding to the respective warnings are registered.

Next, at step S622, the information regarding the poor product quality output from the transmitting unit 413 is received by the operator or the receiver unit 421 of the portable terminal 1 designated by this information. At this stage, the receipt by the portable terminal 1 takes place automatically without any receiving action made by the operator such as pressing of a predetermined key. The information received by the receiver unit 421 is then sent to the notifying unit 423 at step S623, and the detailed information is displayed on the display of the portable terminal 1 in the form of text or image (a still image or a moving image) as in the case of trouble warning described earlier. At the same time, outline information is transmitted in the form of speech to the operator's ears through the acoustic transducer.

At last, the information summation unit 412 determines at step S624 whether the processing in the mounting system is complete. If it is determined that the mounting processing has completed, the information summation unit 412 terminates the program. On the other hand, if the mounting system is still running, the information summation unit 412 returns to the step S601.

Receiving the information regarding the poor product quality through the portable terminal 1, the operator eliminates the cause of the drop in product quality in the relevant apparatus. As a result, the component management table is updated. For instance, in the event that nozzles numbered at 1 and 2 are replaced in the mounting apparatus with apparatus name of MV-1, the transmission complete flag is deleted from the management table shown in FIG. 31C.

If the cause of the drop in product quality in the apparatus is not removed, the information regarding the poor product quality is determined as a target value of transmission at step S611 once again. If the transmission complete flag has been registered, however, the information regarding the poor product quality is deleted from target values of transmission at step S612. This prevents repeated transmission of a message indicative of deterioration in product quality.

Notification of Production Progress

When it is determined at step S613 that the status signal is information regarding production progress in the apparatuses, the information summation unit 412 performs production progress notifying processing at step S614. To be specific, at step S614, the information summation unit 412 registers the received production progress information in a production progress management table 91 shown in FIG. 32A. Registered in the production progress management tables shown in FIG. 32 are the apparatus names, the machine type names, total targeted quantities of substrates to be planned in the apparatuses (planned total quantities), current targeted quantities, current actual quantities of produced/inspected substrates, and differences between the current targeted quantities and the produced/inspected quantities. Of these items, the planned total quantities and the produced/inspected quantities are contained in the status signals. The current targeted quantities are calculated from the total targeted quantities, estimated time of production of the planned total quantities, and elapsed time from the start of production to the present time. The estimated time is calculated from the planned total quantities, while the elapsed time is calculated based on operation signals output from the apparatuses.

Next, for the purpose of judging production progress in the apparatuses, the information summation unit 412 stores the differences between the current targeted quantities and the produced/inspected quantities and predetermined values corresponding to the differences. At step S615, the information summation unit 412 judges production progress in the apparatuses using the predetermined values. If it is determined that the production progress is equal to or smaller than the predetermined values, the program proceeds to a step S616. In other cases, the program jumps to the step S624.

In the event that "−100" is set as the predetermined value for a difference between the current targeted quantity and the produced/inspected quantity, for example, according to the status of operation in the apparatus in FIG. 32A, the information summation unit 412 determines that production progress has slowed down in the apparatus since the difference is "−100". In the case of a mounting system wherein a plurality of apparatuses are arranged in a straight line as shown in FIG. 24, the produced/inspected quantities are approximately equal to each other among the apparatuses. Hence, production progress in one apparatus may be used as production progress in the entire system.

Next, at step S616, the information summation unit 412 judges whether a warning regarding production progress has been already transmitted in relation to the information determined to be equal to or smaller than the predetermined value at step S615. As shown in FIG. 32B, the judgment is made based on whether the time of notification (described later) has been registered in the production progress information management table. Further, if the time of notification has been registered, the judgment is made by confirming whether predetermined re-transmission time (e.g., 10 min, 30 min) has already elapsed. When it is determined that no warning has been transmitted, the program proceeds to the step S619, and when it is determined that the warning has been transmitted, the program proceeds to the step S624.

When it is determined at step S616 that warning has not been transmitted, the information summation unit 412 determines at step S619 an operator (portable terminal) in charge of the apparatus with the trouble regarding production progress or a group including this operator, based on the management tables shown in FIG. 28. Next, at step S620, the information summation unit 412 sends to the transmitting unit 413 a signal containing a message to be transmitted to the portable terminal 1. This signal is output from the transmitting unit 413. The signal output from the transmitting unit 413 contains the code of the apparatus relevant to the production progress warning, a production line including this apparatus, the time of slowdown in production progress, production progress information (including the target production quantity, a difference, and a quantity of completed substrates) and others (e.g., an error rate, a production line utility rate, a change with time in production progress).

As the transmitting unit 413 outputs the signal, as shown in FIG. 32B, at step S621, the information summation unit 412 adds the time of transmission (e.g., the date of 2001/07/19 and the time of 10:15:17) to the production progress management table and records that a production progress warning has been transmitted to the operator relevant to the warning.

Next, at step S622, the production progress warning output from the transmitting unit 413 is received by the operator or the receiver unit 421 of the portable terminal 1 designated by this warning. At this stage, the receipt by the portable terminal 1 takes place automatically without any receiving action made by the operator such as pressing of a predetermined key. The information received by the receiver unit 421 is then sent to the notifying unit 423 at step S623, and the detailed information is displayed on the display of the portable terminal 1 in the form of text or image (a still image or a moving image) as in the case of trouble warning described earlier. At the same time, outline information is transmitted in the form of speech to the operator's ears through the acoustic transducer.

At last, the information summation unit 412 determines at step S624 whether the processing in the mounting system is complete. If it is determined that the mounting processing has completed, the information summation unit 412 terminates the program. On the other hand, if the mounting system is still running, the information summation unit 412 returns to the step S601.

Receiving the information regarding the slowing production progress through the portable terminal 1, the operator performs processing for recovering the production progress in the corresponding apparatus. As the production progress consequently improves after this, the time of transmission is deleted from the production progress management table. In the absence of processing for recovering the production progress in the apparatus, on the other hand, or in the event of failed recovery of production progress despite the recovering processing, the time of transmission in the production progress management table is maintained instead of getting deleted. In this case, although the information regarding the slowing production progress becomes a target value of transmission at step S615 once again, since the transmission complete flag is active, the information regarding the slowing production progress is removed at step S616 from target values of transmission. This prevents repeated transmission of a message indicative of the slowed production progress.

In addition, upon completion of production for one lot, this information is delivered to an operator. Notified of completion of production for one lot, the operator executes a job of changing the lot. In this case, a new predetermined value is registered in relation to the replacing lot in the production progress management table.

Other Notification

When it is determined at steps S2, S6, S9 and S13 that the status signal is none of trouble information, stockout information, product quality information and production progress information, the program proceeds to a step S617. At step S617, the information summation unit 412 performs processing in accordance with the status signals. At step S618, the information summation unit 412 determines whether the result of the processing is to be transmitted to the portable terminals 1. When the result of the processing is to be transmitted, the program proceeds to the step S619, whereas when the result of the processing is not to be transmitted, the program jumps to the step S624. The processing from the step S619 through the step S624 is similar to the warning processing described above, and therefore, is not described again.

As described clearly above, in the message notifying system above, with respect to an event likely to lead to a forced halt of a production system, an operator in charge is notified of the event before the system actually comes to a halt. Hence, notified of the event, the operator can perform appropriate processing on the production system and accordingly prevent a halt of the system beforehand.

Using the message notifying system for automatically receiving a speech-based warning, even if an operator who has received a warning cannot check his or her display, the operator can confirm occurrence of the warned event.

Further, in the message notifying system wherein transmission is made to a plurality of operators, as one operator solves a trouble, the same warning will not be transmitted again to the plurality of operators including this operator.

A text message, a voice message or the like displayed on the display of a portable terminal may be switched into the language used by an operator. In this case, the portable terminal 1 can switch the output. In addition, a table where operators and their languages are registered may be stored in the system controller 41, and an output from the system controller 41 may be changed in accordance with the language to use.

Although the foregoing has described preferred embodiments related to combinations of the message notifying system with a component mounting system, the message notifying system may be combined with another production system. Further, although the information summation unit is disposed to the controller in the preferred embodiments above, the functions of the information summation unit may be installed in the respective apparatuses so that each apparatus sends a warning signal to the portable terminals, or alternatively, the functions of the information summation unit may be installed in the respective portable terminals so that each portable terminal creates a warning signal.

The invention claimed is:

1. A message notifying system for detecting information created during a run of a production facility and for notifying, in the form of a message, an operator of data identified as a target of notification based on the information, wherein the production facility is a mounting facility for mounting electronic components on a printed circuit board, the message notifying system comprising:

a plurality of information receiver units for receiving the information from the production facility, at least one of said information receiver units being selected to receive the information according to a content of the information;

an information summation unit for registering current state information representing a current state of the production facility, based on the information received by said at least one information receiver unit, and for selecting, as target data of notification, the current state information predictive of a halt of the production facility before the production facility comes to a halt;

a portable data sending unit for sending the target data of notification selected by said information summation unit; and a data receipt notifying unit, carried by an operator, for receiving the target data of notification sent from said portable data sending unit, and for notifying the operator of the target data of notification, wherein the information is production progress information representing production progress within the mounting facility, and said information summation unit selects, as the target data of notification, the current state information where the production progress information is less than a set quantity for a target of notification.

2. A message notifying system for detecting information created during a run of a production facility and for notifying, in the form of a message, an operator of data identified as a target of notification based on the information, wherein the production facility is a mounting facility for mounting electronic components on a printed circuit board, the message notifying system comprising:

a plurality of information receiver units for receiving the information from the production facility, at least one of said information receiver units being selected to receive the information according to a content of the information;

an information summation unit for registering current state information representing a current state of the production facility, based on the information received by said at least one information receiver unit, and for selecting, as target data of notification, the current state information predictive of a halt of the production facility before the production facility comes to a halt;

a portable data sending unit for sending the target data of notification selected by said information summation unit; and a data receipt notifying unit, carried by an operator, for receiving the target data of notification sent from said portable data sending unit, and for notifying the operator of the target data of notification, wherein the information is trouble information representing a trouble-induced halt in the mounting facility, and said information summation unit selects, as the target data of notification, the current state information where the trouble information matches a set content for a target of notification.

3. A message notifying method of a message notifying system for detecting information created during a run of a production facility and for notifying, in the form of a message, an operator of data identified as a target of notification based on the information, wherein the production facility is a mounting facility for mounting electronic components on a printed circuit board, the message notifying method comprising:

an information receiving operation of receiving the information from the production facility, wherein the production facility transmits the information to at least one information receiving unit which is selected according to a content of the information from the production facility;

an information summation operation of registering current state information representing a current state of the production facility based on the information received at said information receiving operation, and of selecting, as target data of notification, the current state information predictive of a halt of the production facility before the production facility comes to a halt;

a data sending operation of sending the target data of notification selected at said information summation operation; and a data receipt notifying operation of receiving the target data of notification sent from said data sending operation, and of notifying the operator of the target data of notification, through a portable terminal carried by the operator, wherein the information is production progress information representing production progress within the mounting facility, and said information summation operation comprises selecting the current state information where the production progress information is less than a set quantity for a target of notification as the target data of notification.

4. A message notifying method of a message notifying system for detecting information created during a run of a production facility and for notifying, in the form of a message, an operator of data identified as a target of notification based on the information, wherein the production facility is a mounting facility for mounting electronic components on a printed circuit board, the message notifying method comprising:

an information receiving operation of receiving the information from the production facility, wherein the production facility transmits the information to at least one information receiving unit which is selected according to a content of the information from the production facility;

an information summation operation of registering current state information representing a current state of the production facility based on the information received at said information receiving operation, and of selecting, as target data of notification, the current state information predictive of a halt of the production facility before the production facility comes to a halt;

a data sending operation of sending the target data of notification selected at said information summation operation; and a data receipt notifying operation of receiving the target data of notification sent from said data sending operation, and of notifying the operator of the target data of notification, through a portable terminal carried by the operator, wherein the information is trouble information representing a trouble-induced halt in the mounting facility, and said information summation operation comprises selecting the current state information where the trouble information matches a set content for a target of notification as the target data of notification.

5. A message notifying program stored on a computer readable medium to be executed by a computer for detecting information created during a run of a production facility and for notifying, in the form of a message, an operator of data identified as a target of notification based on the information, wherein the production facility is a mounting facility for mounting electronic components on a printed circuit board, the message notifying program comprising:

an information receiving operation of receiving the information from the production facility, wherein the production facility transmits the information to at least one information receiving unit which is selected according to a content of the information from the production facility;

an information summation operation of registering current state information representing a current state of the production facility based on the information received at said information receiving operation, and of selecting the current state information predictive of a halt of the production facility as target data of notification before the production facility comes to a halt;

a data sending operation of sending the target data of notification selected at said information summation operation; and a data receipt notifying operation of receiving the target data of notification sent at said data sending operation, and of notifying the operator of the target data of notification, through the portable terminal carried by the operator, wherein the information is production progress information representing production progress within the mounting facility, and said information summation operation comprises selecting the current state information where the production progress information is less than a set quantity for a target of notification as the target data of notification.

6. A message notifying program stored on a computer readable medium to be executed by a computer for detecting information created during a run of a production facility and for notifying, in the form of a message, an operator of data identified as a target of notification based on the information, wherein the production facility is a mounting facility for mounting electronic components on a printed circuit board, the message notifying program comprising:

an information receiving operation of receiving the information from the production facility, wherein the production facility transmits the information to at least one information receiving unit which is selected according to a content of the information from the production facility;

an information summation operation of registering current state information representing a current state of the production facility based on the information received at said information receiving operation, and of selecting the current state information predictive of a halt of the production facility as target data of notification before the production facility comes to a halt;

a data sending operation of sending the target data of notification selected at said information summation operation; and a data receipt notifying operation of receiving the target data of notification sent at said data sending operation, and of notifying the operator of the target data of notification, through the portable terminal carried by the operator, wherein the information is trouble information representing a trouble-induced halt in the mounting facility, and said information summation operation comprises selecting the current state information where the trouble information matches with a set content for a target of notification as the target data of notification.

* * * * *